US012252589B2

(12) United States Patent
Garric et al.

(10) Patent No.: US 12,252,589 B2
(45) Date of Patent: Mar. 18, 2025

(54) BRANCHED-BLOCKED COPOLYMER PHOTO-CROSSLINKER FUNCTIONALIZED WITH PHOTOREACTIVE GROUPS AND ITS USE FOR SHAPING DEGRADABLE PHOTO-CROSSLINKED ELASTOMERS SUITABLE FOR MEDICAL AND TISSUE-ENGINEERING APPLICATIONS

(71) Applicants: UNIVERSITE DE MONTPELLIER, Montpellier (FR); CENTRE NATIONAL DE LA RECHERCHE SCIENTIFIQUE (CNRS), Paris (FR); ECOLE NATIONALE SUPERIEURE DE CHIMIE DE MONTPELLIER, Montpellier (FR); UNIVERSITE DE GRENOBLE ALPES, Saint Martin d'Heres (FR)

(72) Inventors: Xavier Garric, Montpellier (FR); Frédéric Bossard, Champ du Drac (FR); Louis Gangolphe, Paris (FR); Benjamin Nottelet, Montpellier (FR)

(73) Assignees: UNIVERSITE DE MONTPELLIER, Montpellier (FR); CENTRE NATIONAL DE LA RECHERCHE SCIENTIFIQUE (CNRS), Paris (FR); ECOLE NATIONALE SUPERIEURE DE CHIMIE DE MONTPELLIER, Montpellier (FR); UNIVERSITE DE GRENOBLE ALPES, Saint Martin d'Heres (FR)

(*) Notice: Subject to any disclaimer, the term of this patent is extended or adjusted under 35 U.S.C. 154(b) by 788 days.

(21) Appl. No.: 17/420,768

(22) PCT Filed: Jan. 8, 2020

(86) PCT No.: PCT/EP2020/050325
§ 371 (c)(1),
(2) Date: Jul. 6, 2021

(87) PCT Pub. No.: WO2020/144236
PCT Pub. Date: Jul. 16, 2020

(65) Prior Publication Data
US 2023/0167247 A1    Jun. 1, 2023

(30) Foreign Application Priority Data

Jan. 8, 2019 (EP) .................................... 19305027

(51) Int. Cl.
*C08G 81/02* (2006.01)
*C08J 3/24* (2006.01)

(52) U.S. Cl.
CPC .............. *C08G 81/025* (2013.01); *C08J 3/24* (2013.01); *C08G 2230/00* (2013.01); *C08J 2353/00* (2013.01)

(58) Field of Classification Search
CPC ...... C08G 81/025; C08G 2230/00; C08J 3/24; C08J 2371/02
See application file for complete search history.

(56) References Cited

U.S. PATENT DOCUMENTS

| 6,177,095 | B1 | 1/2001 | Sawhney et al. |
| 9,987,393 | B2 | 6/2018 | Anseth et al. |
| 2009/0324721 | A1* | 12/2009 | Kennedy ............... A61L 24/001 |
| | | | 424/78.08 |
| 2012/0322953 | A1 | 12/2012 | Grijpma et al. |

FOREIGN PATENT DOCUMENTS

CN         102146200 A        8/2011

OTHER PUBLICATIONS

Breitenbach et al Amphiphilic Polysaccharide Block Copolymers for pH-Responsive Micellar Nanoparticles, Biomacromolecules 2017, 18, 2839-2848, published on Jul. 26, 2017.*
Xie et al (Photo-crosslinked fabrication of novel biocompatible and elastomeric star-shaped inositol-based polymer with highly tunable mechanical behavior and degradation, J. Mech. Behav. Biomed. Mater., 51 (2015), pp. 163-168, published on Feb. 2015.*
Yuan Li, et al., "Biodegradable soft elastomers: synthesis/properties of materials and fabrication of scaffolds"; RSC Advances, 2012, 2, 8229-8242.
Barbara Rupp, et al., "UV-induced crosslinking of the biopolyester poly(3-hydroxybutyrate)-co-(3-hydroxyvalerate)"; Green Chem., 2010, 12, 1796-1802.
Qizhi Chen, et al., "Elastomeric biomaterials for tissue engineering" Progress in Polymer Science, 38 (2013) pp. 584-671.
Coline Pinese, et al., "Rolled knitted scaffolds based on PLA-pluronic copolymers for anterior cruciate ligament reinforcement: A step by step conception", J Biomed Mater Res Part B, 2016:00B:000-000.
Adrien Leroy, et al., "Investigation on the properties of linear PLA-poloxamer and star PLA-poloxamine copolymers for temporary biomedical applications", Mater. Sci. Eng. C (2013), http://dx.doi.org/10.1016/j.msec.2013.06.001.
Meidong Lang, et al. "Functionalized Multiarm Poly(e-caprolactone)s: Synthesis, Structure Analysis, and Network Formation", Journal of Applied Polymer Science, vol. 86, No. 9, pp. 2296-2306 (2002).

(Continued)

*Primary Examiner* — Gregory Listvoyb
(74) *Attorney, Agent, or Firm* — Thomas | Horstemeyer, LLP

(57) ABSTRACT

The present invention relates to novel degradable branched-block copolymers, comprising a star-shaped copolymer central core or a linear copolymer central core, functionalized with photoreactive groups chosen among aryl-azide, (meth)acrylate or thiol groups. The present invention also relates to the use of these degradable branched-block copolymers as photo-crosslinkers to provide degradable photo-crosslinked elastomers as biomaterials suitable for medical and tissue engineering applications. A method for preparing a degradable photo-crosslinked polymer, preferably a degradable photo-crosslinked elastomer, starting from the branched-block copolymer of the invention via a shaping process and an irradiation step is also provided.

10 Claims, 13 Drawing Sheets

(56) References Cited

OTHER PUBLICATIONS

PCT Search Report in related, co-pending PCT Application No. PCT/EP2020/050325, mailed Mar. 31, 2020.

* cited by examiner

BRANCHED-BLOCKED COPOLYMER PHOTO-CROSSLINKER FUNCTIONALIZED WITH PHOTOREACTIVE GROUPS AND ITS USE FOR SHAPING DEGRADABLE PHOTO-CROSSLINKED ELASTOMERS SUITABLE FOR MEDICAL AND TISSUE-ENGINEERING APPLICATIONS

CROSS REFERENCE TO RELATED APPLICATIONS

This application is the 35 U.S.C. § 371 national stage application of PCT Application No. PCT/EP2020/050325, filed Jan. 8, 2020, which application claims the benefit of European Application No. EP 19305027.5, filed Jan. 8, 2019, both of which are hereby incorporated by reference herein in their entireties.

TECHNICAL FIELD OF THE INVENTION

The present invention relates to novel degradable branched-block copolymers, in particular star copolymer, functionalized with photoreactive groups chosen among aryl-azide, (meth)acrylate or thiol groups, and to the use of said degradable branched-block copolymers as photo-crosslinkers to provide degradable photo-crosslinked elastomers as biomaterials suitable for medical and tissue engineering applications.

BACKGROUND OF THE INVENTION

Polymeric materials are widely used in medical devices. Depending on their usage, degradable polymers with elastic properties are required, in particular in the field of tissue engineering. Such (bio)resorbable materials solve the problems associated with biostable materials, whose long-term fate is generally in question, while producing minimal long-term inflammation.

Biodegradable polymeric materials are typically constituted by thermoplastic polymers or crosslinked material. In particular, crosslinked elastomers currently receive much attention due to numerous specific properties of interest for soft tissue engineering including 1) a linear degradation preserving mechanical properties and 3D structure of the materials over time; 2) the possibility to reach high Young's modulus; and 3) a limited crystallinity coming from less oriented polymeric chains, improving cell colonization and lowering the inflammatory response.

Through all chemically crosslinked elastomers, thermo-crosslinking (radical and condensation reaction), click-chemistry (Diels-Alder cyclo addition, 'thiol-Michael addition', thiol-yne 'click') and photo-crosslinking are the major post-treatments used to produce (bio)resorbable 3-dimensional (3D) networks. However, the currently available degradable elastomers obtained by means of a polycondensation are prepared starting from low molecular weight functional pre-polymers to ensure reactivity but leading to elastomers that are not suitable for shaping before irradiation and whose elastic domains are generally low (Li et al. RSC Advances, 2, 22 (2012) 8229).

As a consequence, a particular interest has been paid to photo-crosslinking due to its advantages such as easy implementation, lower thermal energy production and fast processing for further industrial development. This method requires at least two photo-crosslinkable pendant or chain-end groups (such as acrylate group), and a photo-initiator.

However, the currently available degradable elastomers obtained by this method suffer from several drawbacks. They are either prepared starting from low molecular weight functional pre-polymers to ensure reactivity but leading to elastomers that are not suitable for most thermoplastic shaping processes and present a limited elastic range, or prepared from linear high molecular weight functional pre-polymers with limited reactivity and leading to elastomers with low mechanical properties and reduced elastic range. (Chen et al. Progress in Polymer Science, 38, 3, (2013) 584).

There is thus a need for providing elastomers with enhanced elastic domains that can be easily shaped by means of appropriates process, such as electrospinning or 3D printing technologies, to provide biomaterials with properties that are advantageously consistent with those of native tissues for applications in the medical field.

Besides, research has focused lately on the development of new biocompatible photo-initiators and photo-crosslinking agents to increase the crosslinking efficiency and to modulate elastomers' mechanical and degradation properties. In this respect, Rupp et al. (Green Chemistry, 12 (2010) 1796) reported on the preparation of a photo-crosslinked elastomer generated from the non-functional (poly)hydroxybutyrate-co-hydroxyvalerate (PHBV) thanks to the use of the bis(aryl-azide) 2,6-bis(azidobenzylidene)-4-methylcyclohexanone as photo-crosslinker. This strategy relies on the UV-activation of the aryl-azide group to generate highly reactive nitrene species that can insert into carbon-hydrogen bonds of the polymer backbone, and thus lead to crosslinking via amine groups. However, the disclosed photocrosslinker bis(aryl-azide) 2,6-bis(azidobenzylidene)-4-methylcyclohexanone leads to low crosslinking efficiency especially when materials with thickness superior to 10 µm are targeted.

The present invention therefore seeks to provide a degradable branched-block copolymer functionalized with photoreactive groups as a photo-crosslinker, notably able to crosslink itself, non functionalized degradable polymers and/or high molecular weight functionalized prepolymers with high yield crosslinking, in order to prepare crosslinked degradable elastomers easily shaped in biomaterials suitable for medical and soft-tissue engineering.

SUMMARY OF THE INVENTION

To address this technical problem, the inventors have designed a novel degradable branched-block copolymer, in particular a star copolymer, functionalized with photoreactive groups chosen among azide, (meth)acrylate and thiol groups.

A branched-block copolymer, in particular a star copolymer, has the particularity to present a high number of chain-ends with respect to linear copolymer. Indeed, each arm of the central core of the star-shaped block copolymer of the present invention is carrying at its extremity a photoreactive group. Such a feature is responsible for a good accessibility and reactivity of the functions on the star-shaped copolymer which allow the use of high molecular weight prepolymers and result in high crosslinking yield with improved entanglement thus providing elastomeric biomaterials with hyper-elastic properties.

In contrast with the prior art, the branched-block copolymer crosslinker according to the present invention, especially the star copolymer, allows to increase the crosslinking yield in the resulting elastomer, while controlling over the final elastomer's degradation rates.

In particular, when said photoreactive group is an aryl-azide group, the polymer to be crosslinked does not need to be prefunctionalized with crosslinkable groups. The active nitrene species resulting from the light activation, such as UV-activation, of the aryl-azide groups have more probability to be in contact with the polymer to be crosslinked and to act as a crosslinking agent than the bifunctional-(aryl-azide) crosslinker of the prior art (see Rupp. et al.). Besides, the nitrene species are inserted into carbon-hydrogen bonds of the polymers to be crosslinked, leading to a crosslinking via amine groups between any non-functionalized polymer (FIG. 1). Such a universal crosslinker is thus able to crosslink any polymer containing C—H groups without the need for pre-functionalization.

Furthermore, when said photoreactive group is a (meth)acrylate group or a thiol group, the branched-block-copolymer crosslinker can be of high molecular weight, i.e. higher than 10 000 g·mol−1, while providing a high crosslinking yield. Besides, the functional polymer to be crosslinked does not need to be of low molecular weight and a satisfying crosslinking yield can be obtained with less reactive high molecular weight functional prepolymer thanks to the high crosslinking efficiency of the multifunctional star crosslinkers. The photo-reactive species resulting from the light activation, such as UV-activation, have indeed more probability to be in contact with the reactive functions of the polymer to be crosslinked and therefore allow for the preparation of elastomers with improved properties while being compatible with thermoplastic shaping processes (e.g. electrospinning, fused deposition modelling etc.).

The branched-block copolymer crosslinker of the invention is thus particularly suitable for manufacturing biodegradable elastomeric materials and in particular elastomeric fibrous scaffold advantageously useful for soft-tissue engineering, typically via an electrospinning process or 3D printing technologies. In particular, the branched-block copolymers of the invention have a molecular weight sufficiently high, i.e. of at least 10 000 g/mol, preferably at least 20 000 g/mol, to be used in shaping process as electrospinning process or 3D printing technologies.

Therefore, in a first aspect, the present invention relates to a degradable branched-block copolymer, in particular a star copolymer, comprising a polyether central core having n arms and degradable polymer chains extending from each arm of the polyether central core, the polyether central core being a star core or a linear core, each arm comprising m unit(s) of the monomer corresponding to the polyether, and each degradable polymer chain being constituted by I monomer unit(s) of a degradable polymer, characterized in that each degradable polymer chain is identical and functionalized at its extremity by a photoreactive group chosen among an aryl-azide derivative, a (meth)acrylate group, and a thiol group.

In another aspect, the present invention relates to the use of the degradable branched-block copolymer as defined above as a crosslinker agent, in particular as a photo-crosslinker agent.

In yet another aspect, the present invention relates to a method for preparing a degradable photo-crosslinked polymer, preferably a degradable photo-crosslinked elastomer, comprising the steps of:
(a) preparing a solution or a solid blend comprising a degradable branched-block copolymer as defined above and optionally a prepolymer,
(b) performing a shaping process on the solution or the solid blend resulting from step (a) to provide a shaped object,
(c) irradiating the shaped object resulting from step (b) under light, such as UV light,
(d) recovering the degradable photo-crosslinked polymer, preferably the degradable photo-crosslinked elastomer.

Definitions

As used herein, a "copolymer" is understood as a polymer containing several different repeated units, i.e. at least two different repeated units. A copolymer may be a random copolymer, a block copolymer or a gradient copolymer.

As used herein, a "block copolymer" is understood as a copolymer containing a sequence of different blocks, each containing only one repeated unit. A block copolymer is a single molecule, so that each block is covalently linked to the next block through a covalent bond. For instance, a block copolymer of repeated units A, B and C may have the following structure: AAAAAAAAAABBBBBBBBB-CCCCCCCCCAAAAAAAAACCCCCCCCCBBBB-BBBBB.

As used herein, a "branched-block copolymer" is understood as a branched block copolymer comprising a central core and linear chains linked to this core via a covalent bond. The number of these linear chains is at least three, preferably at least 4. The core could be an atom, a molecule, typically a cyclic molecule, or a polymer (as one block copolymer). The core can be a linear polymer, wherein the monomer units of said polymer are aligned one after the other, or each monomer of said polymer are linked via one and only atom to form a "star polymer". In the context of the present invention, the core is a polyether core, linear or star-shaped. The linear chains extending from the core, also named "arm", are here constituted by at least one degradable polymer.

When the central core is a linear polymer core, it is understood that it comprises at least 4 monomer units of the polymer aligned one after the other, the core being linked to linear polymer chains via functional groups comprising terminal functions or atoms such as an oxygen atom or a NH group. In this case, there are as many linear chains (arms) as there are terminal functions or atoms. Such copolymers are called "hyperbranched-block copolymers".

As used herein, a "star copolymer" or "star-shaped copolymer" is understood as a branched copolymer, wherein at least four linear chains are linked to a star-shaped central core via a covalent bond. The central core has at least four monomers linked one and only atom to form a star.

As used herein, a "crosslinker agent" is understood as a chemical reagent which promotes crosslinking between polymers. Crosslinking is a chemical reaction providing a three-dimensional network via the covalently bonding of macromolecular chains. This reaction is generally initiated by heat, pressure, change in pH, radiation and mostly requires a cross-linking agent.

As used herein, a "photo-crosslinker agent" is understood as a crosslinker agent as defined above which reacts under light irradiation, such as UV irradiation, to promotes photo-crosslinking defined as the photo-induced formation of a covalent bond between at least two macromolecular chains.

As used herein, a "crosslinked" material is understood as a three-dimensional network formed by at least one polymer after being reacted with a crosslinker as defined above. A single polymer can be crosslinked provided that it has two or more arms.

According to the present invention, when a polymer is crosslinked with the branched-block copolymer crosslinker, or that the branched-block copolymer is crosslinked with itself, it is understood that the aryl-azide functions of the branched-block copolymer react under light, such as UV-light, to form amine functions covalently bonding the polymer or another molecule of the branched-block copolymer. Thus, once the branched-block copolymer has reacted under light and is crosslinked, the azide functions of the branched-block copolymer are not present and are replaced by amine functions in the resulting crosslinked polymer.

According to the present invention, when a polymer is crosslinked with the branched-block copolymer crosslinker, or that the branched-block copolymer is crosslinked with itself, it is understood that the (meth)acrylate functions of the branched-block copolymer react under light, such as UV-light, to form C—C bonds covalently bonding the functional polymer to be crosslinked and the branched-block copolymer or covalently bonding the branched-block copolymer with another molecule of the branched-block copolymer. Thus, once the branched-block copolymer has reacted under light and is crosslinked, the (meth)acrylate functions of the branched-block copolymer are not present and are replaced by C—C bonds in the resulting crosslinked polymer.

According to the present invention, when a polymer is crosslinked with the branched-block copolymer crosslinker, or that the branched-block copolymer is crosslinked with itself, it is understood that the thiol functions of the branched-block copolymer react under light, such as UV-light, to form thio-based bonds (for example thioether) covalently bonding the functional polymer to be crosslinked and the branched-block copolymer or covalently bonding the branched-block copolymer with another molecule of the branched-block copolymer. Thus, once the branched-block copolymer has reacted under light and is crosslinked, the thiol functions of the branched-block copolymer are not present and are replaced by thio-based bonds in the resulting crosslinked polymer.

As used herein in the present invention, a "molecular weight" refers to the number average molecular weight. The polymers of the present invention are characterized by NMR (nuclear magnetic resonance) and not by SEC (size exclusion chromatography).

As used herein, a "photoreactive group" is understood as a chemical group which undergoes chemical, structural and/or physical modifications under light activation, such as UV activation.

As used herein, a "photocrosslinkable group" is understood as a photoreactive group as defined above which is used to crosslink a polymer under light activation.

As used herein, an "aryl-azide derivative" is understood as a functional group comprising at least one aryl-azide function. For example, an aryl-azide derivative according to the present invention is an azidobenzoyl group.

As used herein, a "degradable polymer" is understood as a polymer capable of decomposition in small molecules such as water, carbon dioxide, methane, in particular by means of enzymes (enzymatic degradation, typically with micro-organism) or water (hydrolytic degradation) or any chemical reaction (for example aminolysis). "Degradable" and "biodegradable" are interchangeable in the present specification.

As used herein, a "degradable elastomer" is understood as a polymer having elastic properties and comprising degradable macromolecular chains. Being elastomeric means having elastic properties so that the elastomeric material tends to return to its original shape after being stretched or compressed.

As used herein, a "prepolymer" is understood as a polymer intended to be crosslinked by reacting with a crosslinker agent to form a crosslinked material. According to the present invention, the crosslinking is advantageously a photocrosslinking.

As used herein, a "non functionalized prepolymer" is understood as a polymer intended to be crosslinked, which does not contain a crosslinkable pendant or chain-end group able to react with a suitable reagent to crosslink. Such crosslinkable groups are for example (meth)acrylate.

As used herein, a "biomaterial" is understood as a polymeric material, in particular an elastomeric material, compatible with animals, including with human body, and suitable for medical application, in particular for tissue engineering or a medical device (catheter, drain, fixation apparatus) or implants.

As used herein, a "shaped object" is a polymer or a mixture of polymers, as a mixture of a prepolymer and the branched-block copolymer of the invention, which has undergone a shaping process, as electrospinning, extrusion or 3D printing technologies, and that is crosslinked, for example by irradiation. The shaped object can be, for example, a film, a thread, a fiber, a tube, a mesh or a mat.

As used herein, an "elastomeric fibrous scaffold" is understood as a support, shaped in such a way that it can be used properly, and made of elastomeric fibers. In the context of the present invention, the elastomeric fibers are crosslinked by means of the star copolymer as described here and manufacturing by a process containing a step of electrospinning. The elastomeric fibrous scaffolds of the invention are typically suitable for manufacturing medical devices.

As used herein, "electrospinning" is understood as a shaping process for manufacturing polymer fiber which uses electric force to draw charged threads of polymer solutions up to fiber diameters in the order of some hundred nanometers.

As used herein, "extrusion" is understood as a shaping process wherein a compressed material is forced to pass through a die having the cross-section of the part to be obtained.

Different form of polymeric material can be obtained such as tube, pipe, plate, sheet, film.

As used herein, "tissue engineering" refers to the technical field of repairing damaged or diseased tissues and organs. In particular, since most of soft tissues in the human body are usually supported by collagen fibers to form a three-dimensional microstructure, fibrous polymer scaffolds have the advantage to mimic the structure, mechanical and biological environment of natural soft tissues, which benefits for their regeneration and remodeling.

In the present invention, PEG stands for polyethylene glycol. The term $(PEG)_{narm}$ means that the PEG core provides n arms in the star-shaped copolymer, each arm being substituted with m unit(s) of PEG monomer.

For example, a (PEG)$_{4arm}$ compound responds to the formula:

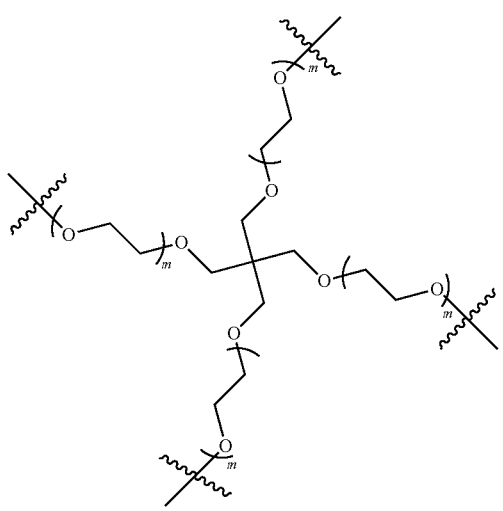

The (PEG)$_{6arm}$ compound responds to the formula

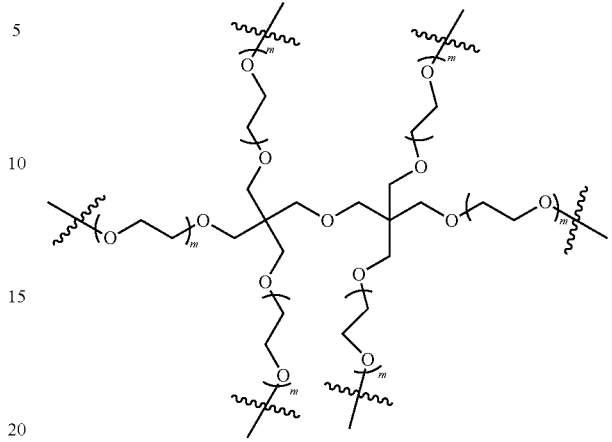

The (PEG)$_{8arm}$, also named 8-arm poly(ethyleneglycol)(tripentaerythritol), responds to the formula

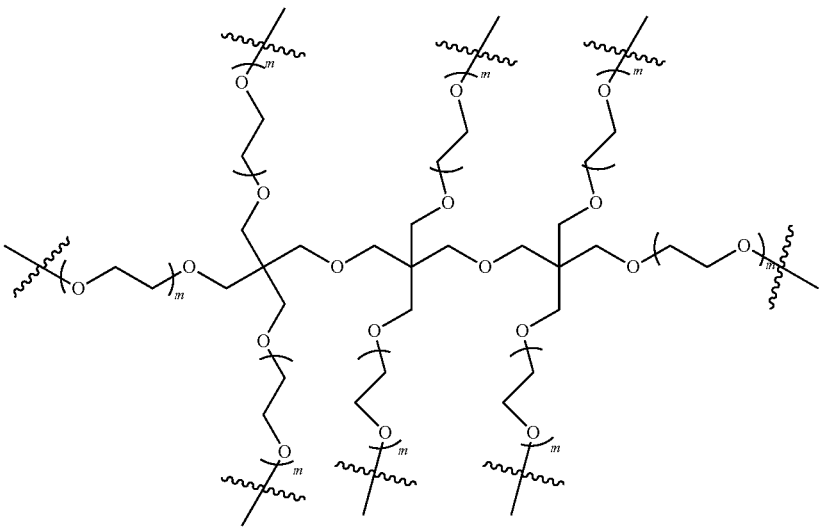

In another embodiment of the present invention, the polymer core of the branched-block copolymer can be a linear core. In particular it can be a linear PEG core which consist in repeated units of the PEG monomer aligned one after the other and substituted by functional groups R on each side, each functional group R providing n/2 terminal functions or atoms from which the degradable polymer chain can extend. Such terminal functions or atoms can be an oxygen atom or NH groups.

For example, such linear cores can respond to the following formulas:

n=4

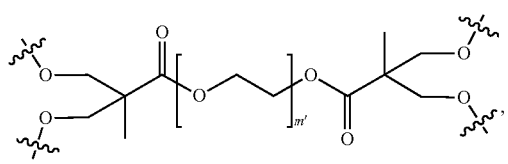

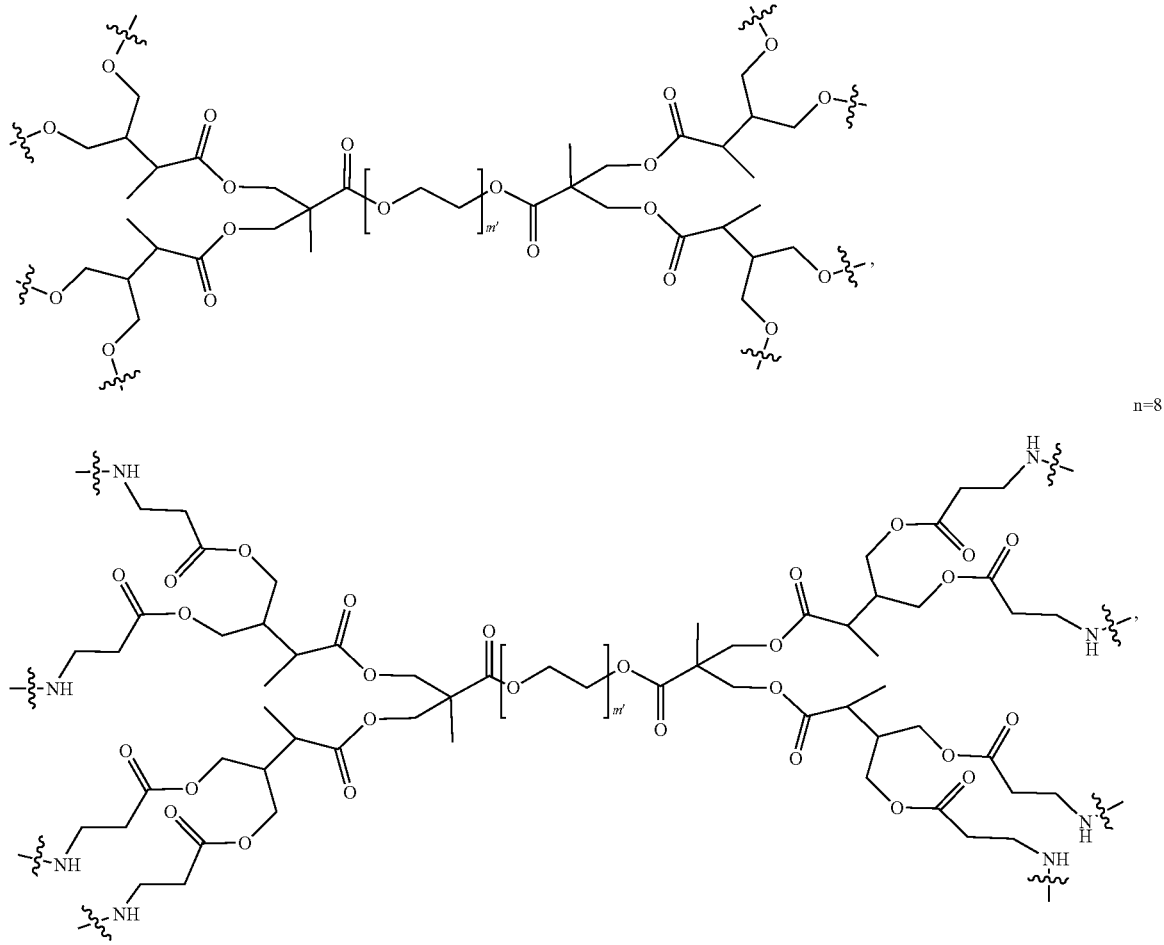

In the present invention, PLA stands for poly(lactide). $PLA_{94}$ means that the PLA is constituted by 94% of L-lactic units and 6% of D-Lactic units.

In the present invention, PCL stands for polycaprolactone, also named poly(ε-caprolactone).

In the present invention, PHB stands for polyhydroxybutyrate.

In the present invention, PHBV stands for polyhydroxybutyrate-co-hydroxyvalerate In the present invention, PGA stands for polyglycolic acid.

In the present invention, PLA-Pluronic®-PLA stands for the copolymer comprising PLA unit and poloxamer unit and having the following structure:

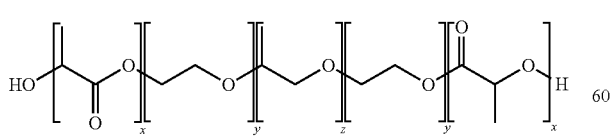

This copolymer is also noted as $PLA_{50}$-Pluronic®-$PLA_{50}$ or $PLA_{50}PLU$ in the following examples.

As used herein, the wording "(meth)acrylate group" includes methacrylate or acrylate group.

DETAILED DESCRIPTION

In a first aspect of the invention, a degradable branched-block copolymer comprising a polyether central core having n arms and degradable polymer chains extending from each arm of the polyether central core is provided, the polyether central core being a star core or a linear core, each degradable polymer chain being constituted by I monomer unit(s) of a degradable polymer, characterized in that each degradable polymer chain is identical and functionalized at its extremity by a photoreactive group chosen among an arylazide derivative, a (meth)acrylate group or a thiol group, said degradable branched-block copolymer being illustrated by the following schema:

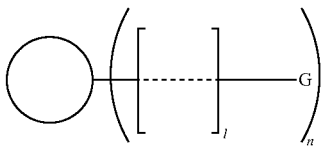

wherein - - - is the monomer unit of the degradable polymer constituting the degradable polymer chain,
G is the photoreactive group,
n is an integer of at least 4, and is

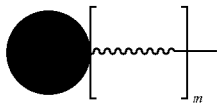

wherein

is the star polyether central core, and
~~~ is the monomer unit corresponding to the polyether core, and
m is comprised between 4 and 400 and l is comprised between 4 and 1500, or

is

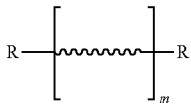

wherein ~~~ is the monomer unit which forms the linear polyether central core, and R is a multivalent branched functional group comprising a number n/2 of terminal functions or atoms selected among oxygen atom or NH group, each of this terminal function being linked to one polymer chain and
m is comprised between 4 and 600 units and l is comprised between 2 and 400.

A number of arms n of at least 4 allows ensuring a high crosslinking yield between branched-block copolymer of the present invention with a polymer or with itself despite the high molecular weight of the branched-block copolymer. Indeed, the numbers n, m and l in the copolymer of the present invention are chosen in order to obtain the optimal compromise between a high molecular weight of the copolymer itself and a high reactivity of the copolymer chain ends. By having a number of arms n of at least 4, the degradable branched-block copolymer of the present invention can have a molecular weight sufficiently high for the applications recited above (i.e. a molecular weight of at least 10 000 g/mol, even at least 20 000 g/mol) while having a polymer chain length, defined by the numbers m and l, shorter enough to provide a good reactivity and thus a high crosslinking yield.

In a preferred embodiment, the polyether of the central core is chosen among polyethylene glycol (PEG), poloxamer and poloxamine. Preferably, the polyether central core is a PEG central core.

In another embodiment, each arm of the polyether central core is substituted with a degradable polymer chain, said degradable polymer chain being constituted by l unit(s) of a degradable polymer. The polymer chain can comprise one degradable polymer, or a mixture of at least two degradable polymers. The polymer chain can be for example a block copolymer or a polymer "ABABABABA".

Preferably, the degradable polymer of the degradable polymer chain is selected from the group consisting of a polyester, a polycarbonate and mixtures thereof. Advantageously, the degradable polymer chain is hydrophobic.

In a preferred embodiment, the degradable polymer of the degradable polymer chain is a polyester, for example selected from the group consisting of poly(lactide) (PLA), poly(ε-caprolactone) (PCL), polyhydroxybutyrate (PHB), polyhydroxybutyrate-co-hydroxyvalerate (PHBV), polyglycolic acid (PGA), poly(3-hydroxyvalerate), polydioxanone and mixture thereof, but not limited to. More preferably, the degradable polyester is PLA.

According to the present invention, the branched-block copolymer has a molecular weight advantageously higher than 10 000 g/mol, preferably higher than 15 000 g/mol, more preferably higher than 20 000 g/mol, even more preferably higher than 25 000 g/mol.

In a preferred embodiment, each polymer chain of the degradable branched-block copolymer is functionalized at its extremity with an aryl-azide derivative, such as an azidobenzoyl group, more preferably the 4-azidobenzoyl group (Bz-N3).

The light activation, such as UV-light activation, of the aryl-azide function results in the formation of highly reactive nitrene species. Nitrene are carbene analogues wherein the nitrogen atom has an electrophile behavior and is for example able to be inserted into CH bonds to form an amine bond.

According to this embodiment, the degradable polyester of the degradable polymer chain is preferably the semi-crystalline $PLA_{94}$ which allows to enhance the expected elastomeric behavior of the resulting crosslinked elastomer thanks to the combination of crystalline nods and chemical crosslink in the 3D network.

In another preferred embodiment, each polymer chain of the degradable branched-block copolymer is functionalized at its extremity with a (meth)acrylate group or a thiol group, preferably with a (meth)acrylate group, more preferably with a methacrylate group.

According to the present invention, the (meth)acrylate or thiol-functionalized degradable branched-block copolymer is non-water-soluble. Such non water-solubility property results from the ratio between the hydrophilic polyether core and the preferably hydrophobic polymer chains. In the branched-block copolymer having a star-shaped core according to the present invention, said ratio is represented by the ratio m/l being strictly superior to 0 and lower than or equal to 3. In the branched-block copolymer having a linear core according to the present invention, said ratio is represented by the ratio m/(n*l) being strictly superior to 0 and lower than or equal to 1.

According to this embodiment, the degradable polyester of the degradable polymer chain is preferably the amorphous $PLA_{50}$.

In one embodiment, the core of the branched-block copolymer is linear, and thus different from a star-shaped central core, resulting in a hyperbranched-block copolymer. In said hyperbranched-block copolymer according to this embodiment, the number n of arms extending from the linear core is of at least 4, advantageously comprised between 4 and 32, preferably between 4 and 16, more preferably n is equal to 4, 8 or 16. According to this embodiment, the hyperbranched-block copolymer with linear central core can be illustrated by the following schema:

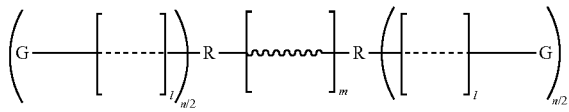

wherein ∼ is the monomer unit which forms the linear polyether central core, and R is a multivalent branched functional group comprising a number n/2 of terminal functions or atoms selected among oxygen atom or NH group, each of this terminal function being linked to one polymer chain,

- - - is the monomer unit of the degradable polymer constituting the degradable polymer chain, G is the photoreactive group and n is an integer of at least 4, m is comprised between 4 and 600 units and l is comprised between 2 and 400.

In the hyperbranched-block copolymer with linear central core of the invention, each terminal function being an oxygen atom or a NH group is substituted by one degradable polymer chain as defined above.

In a preferred embodiment, the polyether of the hyperbranched-shaped central core is chosen among polyethylene glycol (PEG), poloxamer or poloxamine. Preferably, the polyether central core is a PEG central core.

The hyperbranched-block copolymer with linear central core according to the present invention is advantageously symmetrical. The linear central core is substituted on each side by an identical functional group R, each group R providing a number n/2 of identical terminal functions or atoms as defined above, each terminal function being substituted by the same polymer chain.

According to a preferred embodiment, the present invention relates to a star copolymer comprising a star-shaped polyether central core having n arms and polymer chains extending from each arm of the polyether central core, n being an integer of at least 4, each arm comprising m unit(s) of the monomer corresponding to the polyether core, and each polymer chain being constituted by l unit(s) of a degradable polymer, characterized in that each polymer chain is identical and functionalized at its extremity by a photo-reactive group chosen among an azide group, a (meth)acrylate group or a thiol group, and m is comprised between 4 and 400 and l is comprised between 4 and 1500.

The star copolymer of the present invention can be illustrated by the following schema:

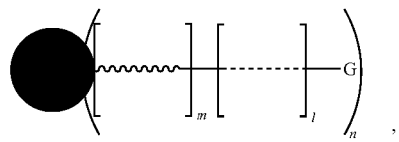

wherein

is the star polyether central core,

∼ is the monomer unit corresponding to the polyether core,

- - - is the monomer unit of the degradable polymer constituting the polymer chain, and G is the photoreactive group.

In another embodiment of the invention, the number n of arms of the degradable star copolymer of the invention is comprised between 4 and 12, preferably between 4 and 8. Advantageously, the star block copolymer of the invention has 4, 6 or 8 arms. More preferably, the polyether central core has 8 arms. An 8-arm star block copolymer is preferred in order to increase the number of reactive sites per molecule of copolymer.

In a preferred embodiment, the polyether of the star-shaped central core is chosen among polyethylene glycol (PEG), poloxamer or poloxamine. Preferably, the polyether central core is a PEG central core.

In a preferred embodiment, each degradable polymer chain of the degradable star copolymer is functionalized at its extremity with an aryl-azide derivative, such as an azidobenzoyl group, more preferably the 4-azidobenzoyl group (Bz-N3).

In a preferred embodiment, the (aryl-azide)-functionalized degradable star copolymer according to the present invention responds to the following formula

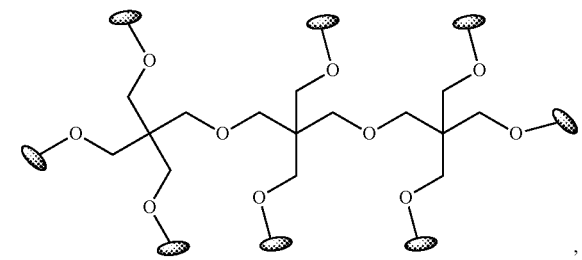

wherein

is the moiety [PEG-PLA-Bz-N3] of formula:

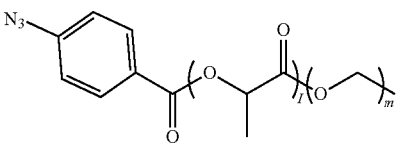

m and l being defined as above.

Such preferred star block copolymer is also noted as $PEG_{8arm}10k\text{-}PLA_{94}\text{-}fN3$ or $s\text{-}PLA\text{-}fN_3$ in the following examples.

In another preferred embodiment, each polymer chain of the degradable star copolymer is functionalized at its extremity with a (meth)acrylate group or a thiol group, preferably with a (meth)acrylate group, more preferably with a methacrylate group.

According to the present invention, the (meth)acrylate or thiol-functionalized degradable star copolymer has advantageously a molecular weight lower than or equal to 100 000 g/mol, preferably lower than or equal to 50 000 g/mol. A molecular weight higher than 100 000 g/mol is often associated with a loss of reactivity of the copolymer due to a lower probability of the (meth)acrylate or thiol functions to react.

According to the present invention, the (meth)acrylate or thiol-functionalized degradable star copolymer is non-water-soluble. Such non water-solubility property results from the ratio m/l, i.e. the ratio between the hydrophilic polyether core and the preferably hydrophobic polymer chains, said ratio m/l being strictly superior to 0 and lower than or equal to 3.

In a preferred embodiment, the (meth)acrylate-functionalized degradable star block copolymer according to the present invention responds to the following formula:

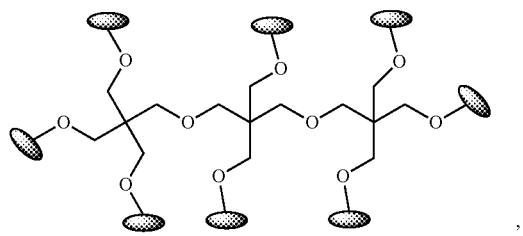

wherein

is the moiety [PEG-PLA-MC] of formula:

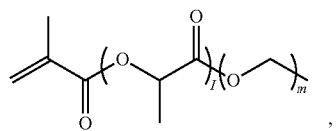

(also referred as $PEG_{8arm}10k\text{-}PLA_{50}\text{-}MC$ or s-PLA-MC in the following example), m being comprised between 4 and 400 and l being comprised between 4 and 1500.

or to the following formula:

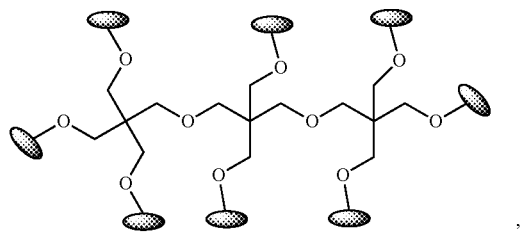

wherein

is the moiety [PEG-PLA-A] of formula:

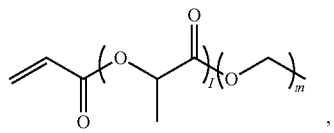

(also referred as $PEG_{8arm}10k\text{-}PLA_{50}\text{-}A$ or s-PLA-A in the following example), m being comprised between 4 and 400 and l being comprised between 4 and 1500.

According to another aspect, the present invention relates to the use of the degradable branched-block copolymer as defined above, preferably the star copolymer as a photo-crosslinker agent.

According to another embodiment, the present invention relates to the use of the branched-block copolymer as defined above, preferably the star copolymer of the invention as a photo-crosslinker agent, in order to prepare a degradable polymeric biomaterial, preferably an elastomeric biomaterial. Advantageously, said polymeric biomaterial is suitable for medical and soft engineering applications such as catheters, drains, fixation devices, dressings, films, patch or in medical reconstruction system such as implant.

According to a further embodiment, the present invention relates to the use of the degradable branched-block copolymer as defined above, preferably the star copolymer to photo-crosslink a prepolymer. Such a photo-crosslinking allows to prepare a photo-crosslinked material.

The prepolymer intended to be photo-crosslinked by means of the branched-block copolymer photo-crosslinker, preferably the star copolymer photo-crosslinker of the present invention can be constituted by one monomer pattern (=homopolymer) or is a copolymer constituted of at least two different monomer patterns.

Advantageously, the prepolymer intended to be photo-crosslinked by means of the branched-block copolymer photo-crosslinker of the present invention, preferably the star copolymer photo-crosslinker of the present invention, is a degradable polymer.

In a preferred embodiment, the present invention relates to the use of the (aryl-azide)-functionalized branched-block copolymer photo-crosslinker defined above, in particular the (aryl-azide)-functionalized star copolymer photo-crosslinker defined above, as a universal photo-crosslinker via the activation of the aryl-azide groups under light such as UV-light. Such a photo-crosslinker is advantageously used to photo-crosslink non-functionalized prepolymers comprising CH-bonds, in which the nitrene species resulting from the UV-activation of the aryl-azide function will be inserted to form an amine bond.

Advantageously, the non-functionalized prepolymer intended to be photo-crosslinked by means of the (aryl-azide)-functionalized branched-block copolymer photo-crosslinker, preferably by the (aryl-azide)-functionalized star copolymer photo-crosslinker defined above, is selected from the group consisting of polyester, polycarbonate, polyvinylic, polyether, polyamide, polyolefin, polyimine, poly(alkylsiloxane), poly((meth)acrylic) and mixtures thereof. Preferably, the non-functionalized prepolymer intended to be photo-crosslinked by means of the (aryl-azide)-functionalized branched-block copolymer photo-crosslinker, preferably by the (aryl-azide)-functionalized star copolymer photo-crosslinker defined above, is selected from the group consisting of PLA, poloxamer, and mixture thereof, but not limited to. More preferably, the non-functionalized prepolymer intended to be photo-crosslinked by means of the (aryl-azide)-functionalized branched-block copolymer photo-crosslinker, preferably by the (aryl-azide)-functionalized star copolymer photo-crosslinker, is a copolymer of PLA with poloxamer, in particular the triblock copolymer PLA-Pluronic@-PLA as illustrated above.

Indeed, such a PLA-Pluronic@-PLA polymer has shown potential as a thermoplastic material for ligament tissue engineering due to their tunable degradation rate and their mechanical properties close to the natural tissue after processing to braided/twisted scaffolds and could thus be suitable to generate elastomer for soft-tissue engineering applications (Pinese, C. et al., *J. Biomed. Mater. Res. B Appl. Biomater.* 105 (2017) 735-743).

In another preferred embodiment, the present invention relates to the use of the (meth)acrylate or thiol-functionalized branched-block copolymer photo-crosslinker, preferably the use of the (meth)acrylate or thiol-functionalized star copolymer photo-crosslinker as defined above, to photo-crosslink prepolymers functionalized with at least one photo-crosslinkable group. Said photo-crosslinkable group is for example a (meth)acrylate group.

Advantageously, the functionalized prepolymer intended to be crosslinked by means of the (meth)acrylate or thiol-functionalized branched-block copolymer photo-crosslinker of the invention, preferably by the (meth)acrylate or thiol-functionalized star copolymer photo-crosslinker as defined above, has a molecular weight lower than or equal to 50 000 g/mol. A low molecular weight prepolymer can improve its reactivity and the availability of the photo-crosslinkable chain-ended group.

In one embodiment the functionalized prepolymer intended to be crosslinked by means of the (meth)acrylate or thiol-functionalized branched-block copolymer photo-crosslinker of the invention, preferably by the (meth)acrylate or thiol-functionalized star copolymer photo-crosslinker as defined above, is advantageously selected from the group consisting of polyester, polycarbonate, polyvinylic, polyether, polyamide, polyolefin, polyimine, poly(alkylsiloxane), polyacrylic, poly((meth)acrylic) and mixtures thereof, said prepolymer being functionalized with a photo-crosslinkable group.

Preferably, the functionalized prepolymer intended to be photo-crosslinked by means of the (meth)acrylate or thiol-functionalized branched-block copolymer photo-crosslinker, preferably by the (meth)acrylate or thiol-functionalized star copolymer photo-crosslinker as defined above, is selected from the group consisting of PLA, poloxamer, and mixtures thereof, but not limited to. More preferably, the functionalized prepolymer intended to be photo-crosslinked by means of the (meth)acrylate or thiol-functionalized branched-block copolymer photo-crosslinker, preferably by the (meth)acrylate or thiol-functionalized star copolymer photo-crosslinker as defined above, is a copolymer of PLA with poloxamer, in particular the triblock copolymer PLA-Pluronic®-PLA as illustrated above.

According to another embodiment of the present invention, the branched-block copolymer photo-crosslinker of the invention, in particular the star copolymer photo-crosslinker of the invention, functionalized with aryl-azide derivatives or (meth)acrylate or thiol groups, is able to react with itself to form a photo-crosslinked material. In such an embodiment, no prepolymer is needed and the targeted crosslinked polymer, preferably a crosslinked elastomer, is obtained starting from the branched-block copolymer of the invention alone, preferably from the star copolymer of the invention alone.

According to another aspect, the present invention relates to a method for preparing a degradable photo-crosslinked polymer, preferably a degradable photo-crosslinked elastomer, comprising the steps of:
(a) preparing a solution or a solid blend comprising the branched-block copolymer of the invention, preferably the star copolymer as defined above, and optionally a prepolymer,
(b) performing a shaping process on the solution or the solid blend resulting from step (a),
(c) irradiating the solution or the solid blend resulting from step (b) under light, such as UV light,
(d) recovering the degradable photo-crosslinked polymer, preferably the degradable photo-crosslinked elastomer.

In one embodiment, the above method is performed starting from the (aryl-azide)-functionalized branched-block copolymer photo-crosslinker, in particular the (aryl-azide)-functionalized star copolymer photo-crosslinker, and a non-functionalized prepolymer having at least one CH bond. In another embodiment, the above method is performed starting from the (aryl-azide)-functionalized hyperbranched-block copolymer photo-crosslinker and a non-functionalized prepolymer having at least one CH bond.

In yet another embodiment, the above method is performed starting from the (meth)acrylate-functionalized or thiol-functionalized branched-block copolymer photo-crosslinker, in particular the (meth)acrylate-functionalized or thiol-functionalized star copolymer photo-crosslinker, and a prepolymer functionalized with a photo-crosslinkable group. In another embodiment, the above method is performed starting from the (meth)acrylate-functionalized or thiol-functionalized hyperbranched-block copolymer photo-crosslinker and a prepolymer functionalized with a photo-crosslinkable group.

In yet another embodiment, the above method is performed starting from the (aryl-azide)-functionalized branched-block copolymer photo-crosslinker only. Preferably, the above method is performed starting from the (aryl-azide)-functionalized star copolymer photo-crosslinker only. In another embodiment, the above method is performed starting from the (aryl-azide)-functionalized hyperbranched-block copolymer photo-crosslinker only.

In yet another embodiment, the above method is performed starting from the (meth)acrylate-functionalized branched-block copolymer photo-crosslinker only. Preferably, the above method is performed starting from the (meth)acrylate-functionalized star copolymer photo-crosslinker only. In another embodiment, the above method is performed starting from the (meth)acrylate-functionalized hyperbranched-block copolymer photo-crosslinker only.

In yet another embodiment, the above method is performed starting from the thiol-functionalized branched-block copolymer photo-crosslinker only. Preferably, the above method is performed starting from the thiol-functionalized star copolymer photo-crosslinker only. In another embodiment, the above method is performed starting from the thiol-functionalized hyperbranched-block copolymer photo-crosslinker only.

According to a further embodiment, the shaping process of step (b) is chosen among extrusion, film coating, film spraying, film casting, electrospray, electrospinning or 3D printing technologies such as fused deposition modelling, multijet printing, stereolithography, digital light processing, selective laser sintering or continuous liquid interface production.

According to another embodiment, step (b) and step (c) are achieved simultaneously, in particular when the shaping process is electrospinning.

Advantageously, step (c) can be achieved in presence of a photo-initiator such as 2,2 diméthoxy-2-phenylacetophenone or eosin-Y, in particular when the light source is different of UV light.

In another embodiment, the UV irradiation is performed with a mercury or a metal halide bulb, preferably a mercury bulb, or with UV LED.

In yet another embodiment, the UV wavelength of the irradiation is comprised between 254 and 400 nm.

In yet another embodiment, the UV irradiation is performed for a time comprised between 1 second and 10 minutes, preferably between 5 seconds and 5 minutes, more preferably for 1 minute.

In one embodiment, at step (a), the prepolymer is mixed with the branched-block copolymer at a (prepolymer/branched-block copolymer) weight ratio comprised between 10/90 and 90/10, preferably between 50/50 and 90/10, more preferably at a 50/50 ratio.

According to yet another embodiment, the degradable photo-crosslinked polymer, preferably a degradable photo-crosslinked elastomer, obtainable by the above described method is shaped as a film, threads, fibers, tubes, mesh or mats. In particular, a degradable photo-crosslinked elastomeric fibrous scaffold is obtained by the above described method by using an electrospinning process.

In another embodiment, the degradable photo-crosslinked polymer, preferably a degradable photo-crosslinked elastomer, obtainable by means of the above described method is a degradable polymeric biomaterial suitable for medical and soft engineering applications such as catheters, drains, fixation devices, dressings, films, patch or in medical reconstruction system such as implant.

The present invention also relates to a degradable photo-crosslinked elastomer obtainable by the method described above. According to a further embodiment, a degradable photo-crosslinked elastomer obtainable by the method described above for use in medical and tissue engineering applications is provided. Said degradable photo-crosslinked elastomer is for example catheters, drains, fixation devices, dressings, films, patch or in medical reconstruction system such as implant.

According to yet another embodiment, the degradable photo-crosslinked elastomer is a film or an elastomeric fibrous scaffold.

According to one embodiment, the degradable photo-crosslinked elastomeric fibrous scaffold is generating starting from a prepolymer, preferably a degradable prepolymer photo-crosslinked with the star-shaped copolymer photo-crosslinker according to the present invention via an electrospinning process.

Figure 1:
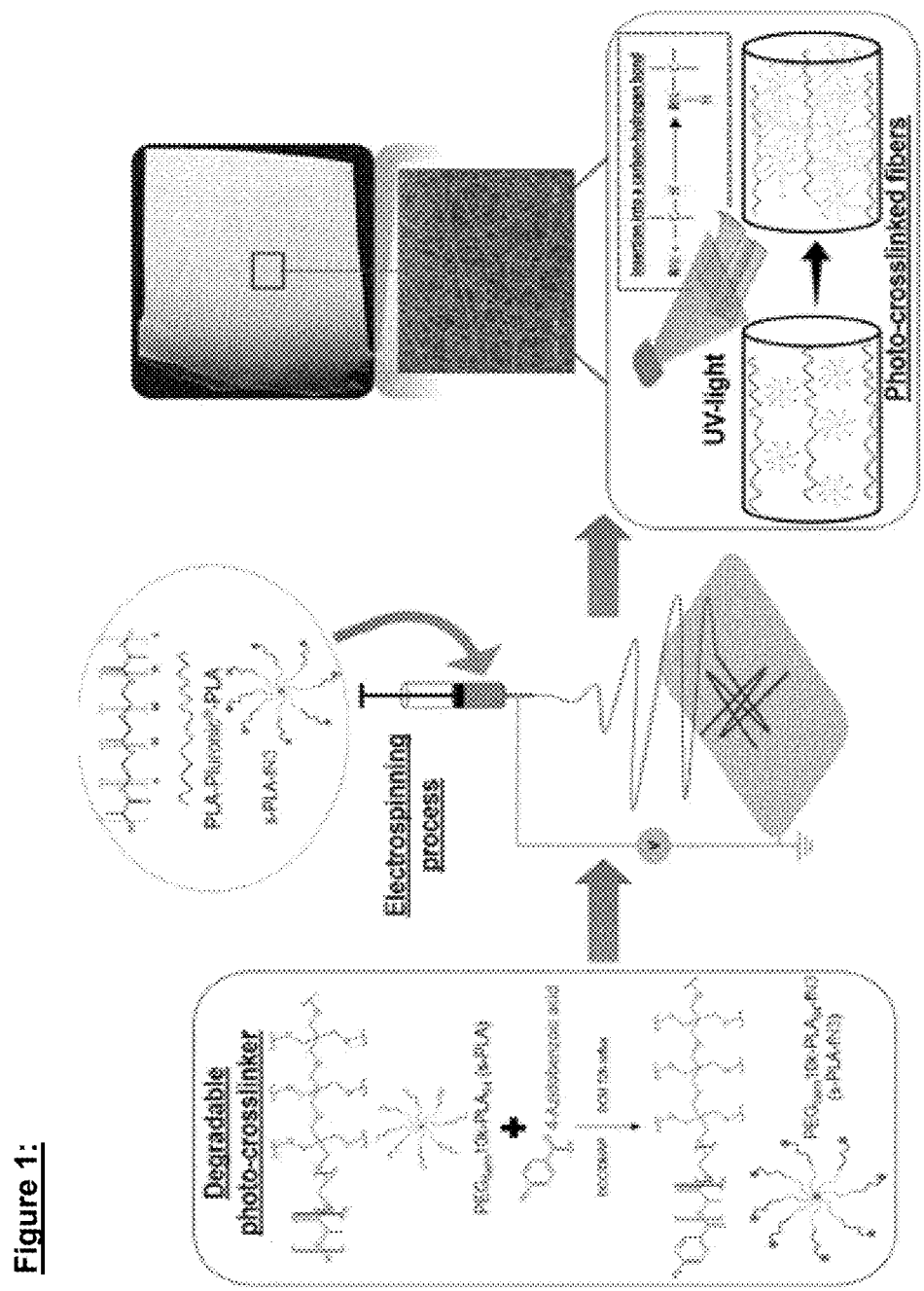
FIG. 1: Scheme of the design of elastic micro-fibrous scaffold based on the multifunctional aryl-azide star block copolymer photo-crosslinker of the present invention.

The present invention is illustrated by the following examples.

EXAMPLES

1. Materials and Methods 1.1 Materials

D,L-lactide and L-lactide were purchased from Purac (Lyon, France). 8-arm Poly(ethylene glycol) (tripentaerythritol) (PEG$_{8arm}$10k, Mw=10 000 g·mol-1) was purchased from JenKem Technology Co., Ltd (Beijing, China). Poloxamer (Pluronic@F127, Mw=12 600 g·mol-1), tin(II) 2-ethylhexanoate (Sn(Oct)$_2$, 95%), dichloromethane (DCM), diethylether (Et$_2$O), N,N-dicyclohexyl-carbodiimide (DCC), 4-(dimethylamin)pyridine (DMAP) and N,N-dimethylformamide (DMF), tetrahydrofuran (THF) were purchased from Sigma-Aldrich (St Quentin Fallavier, France). 2,6-Bis(4-azidobenzylidene)-4-methylcyclohexanone (BA) and 4-azidobenzoic acid were bought from TCI (Paris, Europe). All chemicals were used without further purification with exception of DCM and DCC. DCM was dried over calcium hybrid and freshly distillated before use. DCC was solubilized in anhydrous DCM with MgSO$_4$, stirred during 6 hours, then filtered and dried before use.

1.2 Characterization

FT-IR

FT-IR spectra of polymer films were recorded with a Perkin Elmer Spectrum 100 spectrometer.

TGA

TGA analyses were recorded under nitrogen atmosphere with a Perkin Elmer TGA 6. Sample are maintained at 30° C. for 1 minute and then, heated to 300° C. at a rate of 10° C.·min$^{-1}$.

SEC

Average molecular weights ($\overline{Mn}$) and dispersities (Đ) were determined by size exclusion chromatography (SEC) Shimadzu using two mixed medium columns PLgel 5 µm MIXED-C (300×7.8 mm), Shimadzu RI detector 20-A and Shimadzu UV detector SPD-20A (370 nm$^{-1}$) (40° C. thermostatic analysis cells). Tetrahydrofuran (THF) was the mobile phase with 1 mL·min$^{-1}$ flow at 30° C. (column temperature). Polymer was dissolved in THF to reach 10 mg·mL$^{-1}$ concentration; afterwards, solution was filtered through a 0.45 µm Millipore filter before injection. $\overline{Mn}$ and Đ were expressed according to calibration using polystyrene standards.

NMR Spectra $^1$H NMR spectra were recorded from an AMX Brucker spectrometer operating at 300 MHz at room temperature. The solvent used was deutered chloroform and DMSO-d6. The chemical shift was expressed in ppm with respect to tetramethylsilane (TMS).

Thermal properties of the polymers were analysed by differential scanning calorimetry (DSC) from a Perkin Elmer Instrument DSC 6000 Thermal Analyzer characterized of the different polymers. It was carried out under nitrogen. Samples were heated to 100° C. (10° C.·min$^{-1}$), then cooled to −50° C. (10° C.·min$^{-1}$), before a second heating ramp to 120° C. (5° C.·min$^{-1}$). Samples based on PEG$_{8arm}$10k-PLA$_{94}$ were heated to 180° C. (10° C.·min$^{-1}$), then cooled to −50° C. (10° C.·min-1), before a second heating ramp to 180° C. (5° C.·min$^{-1}$). Glass transition temperature (Tg) was measured on the second heating ramp.

Morphology of the samples was examined with a Hitachi S4800 Scanning electron microscope (Technology platform of IEM Laboratory of the Balard Chemistry pole) with an acceleration voltage of 2 kV and at magnifications ×500, ×1000 and ×5000 times with 3 images at each magnification.

1.3 Synthesis of Copolymers

Triblock copolymer PLA$_{50}$-Pluronic®-PLA$_{50}$ (prepolymer PLA$_{50}$PLU), PEG$_8$arm10k-PLA$_{50}$ (50% L-Lactic units and 50% D-Lactic units), PEG$_{8arm}$10k-PLA$_{94}$ (94% L-Lactic units and 6% D-Lactic units) (star copolymer non functionalized, s-PLA) were synthesized by ring-opening polymerization (ROP) as described in a previous work of the inventors (Leroy, A. et al, Mater. Sci. Eng. C. 33 (2013) 4133-4139).

Pla$_{50}$-Pluronic®-Pla$_{50}$ (Prepolymer)

For PLA$_{50}$PLU, three molecular weights were targeted: 50 000, 100 000 and 200 000 g·mol$^{-1}$, with the corresponding copolymers being noted as PLA$_{50}$PLU50, PLA$_{50}$PLU100 and PLA$_{50}$PLU200, respectively.

For this, determined amounts of D,L-lactide, L-lactide and Pluronic®F127 were introduced in a flask, to which Sn(Oct)$_2$ was then added (0.1 mol % with respect to $_{D, L}$-lactide units). Argon-vacuum cycles were applied before sealing the flask under vacuum. ROP was carried out in an oven at 130° C. for 5 days under constant stirring. Afterwards, the mixture was dissolved in DCM and precipitated in cold Et$_2$O. The final triblock copolymer was dried under reduced pressure to constant mass.

$^1$H NMR (300 MHz; CDCl$_3$): δ (ppm)=5.1 (q, 1H, CO—CH—(CH$_3$)—O), 3.6 (s, 4H, CH$_2$—CH$_2$—O), 3.5 (m, 2H, CH(CH$_3$)—CH$_2$—O), 3.4 (m, 1H, CH(CH$_3$)—CH$_2$—O), 1.5 (m, 3H, CO—CH(CH$_3$)—O), 1.1 (m, 3H, CH(CH$_3$)—CH$_2$—O).

The copolymer molecular weight was determined using the equations (1) and (2) acknowledging a molecular mass of 72 g·mol$^{-1}$ for the lactic unit.

$$\overline{DP}_{PLA}=\overline{DP}_{PEG}*(I5.1PLA \text{ peak integration}/I3.6PEG \text{ peak integration}) \quad (1)$$

$$\overline{Mn}=2*(\overline{DP}_{PLA}*72)+\overline{Mn}_{Pluronic\ F127} \quad (2)$$

PEG$_{8arm}$10k-PLA$_{94}$ 20 000 g/mol (s-PLA-20), PEG$_{8arm}$10k-PLA$_{50}$ 25 000 g/mol (s-PLA-25), PEG$_{8arm}$10k-PLA$_{50}$ 50 000 g/mol (s-PLA-50) and PEG$_{8arm}$10k-PLA$_{50}$ 100 000 g/mol (s-PLA-100) (non functionalized)

For PEG$_{8arm}$10k-PLA$_{94}$ an overall molecular weight of 20 000 g·mol$^{-1}$ was targeted.

For PEG$_{8arm}$10k-PLA$_{50}$ an overall molecular weight of 25 000 g·mol$^{-1}$ or 50 000 g·mol$^{-1}$ or 100 000 g·mol$^{-1}$ was targeted.

For this, determined amounts of D,L-lactide, L-lactide and PEG$_{8arm}$10k were introduced in a flask, to which Sn(Oct)$_2$ was then added (0.1 mol % with respect to $_{D,L}$-lactide units). Argon-vacuum cycles were applied before sealing the flask under vacuum. ROP was carried out in an oven at 130° C. for 5 days under constant stirring. Afterwards, the mixture was dissolved in DCM and precipitated in cold Et$_2$O. The final star copolymer was dried under reduced pressure to constant mass. A low dispersity of 1.1 was determined by SEC analysis.

PEG$_{8arm}$ 10k-PLA$_{94}$:
$^1$H NMR (300 MHz; CDCl$_3$): δ (ppm)=5.1 (q, 1H, CO—CH—(CH$_3$)—O), 4.3 (m, 2H, O—CH$_2$—C—CH$_2$—O), 3.6 (s, 4H, CH$_2$—CH$_2$—O), 3.3 (m, 2H, O—CH$_2$—C—CH$_2$—O), 1.5 (t, 3H, CO—CH—(CH$_3$)—O).

The star copolymer molecular weight was determined using equations (1) and (3)

$$\overline{Mn}=8*(\overline{DP}_{PLA}*72)+\overline{Mn}_{pEG8arm10k} \quad (3)$$

1.4 Synthesis of the aryl-azide-Functionalized PEG$_{8arm}$10k-PLA$_{94}$ (s-PLA-fN$_3$) (FIG. 2a)

The 8-armed star copolymer PEG$_{8arm}$10k-PLA$_{94}$ ($\overline{Mn}_{theo}$=20 kg·mol$^{-1}$) was solubilized in freshly distilled DCM (20% w/v). Determined amounts of 4-azido benzoic acid (2.5 eq./OH group), DCC (2.5 eq./OH group) and DMAP (2.5 eq./OH group) were added. The mixture was heated at 45° C. for 6 days under stirring in the dark. The reaction medium was filtered and washed (three times) by an aqueous solution of Na$_2$CO$_3$ then dried with MgSO$_4$. The copolymer solution was precipitated in cold diethyl ether in the dark. The aryl-azide functionnal PEG$_{8arm}$10k-PLA$_{94}$ (s-PLA-fN$_3$) was dried under reduced pressure to constant mass. The yield of functionalization was determined by comparing the integration of the aryl-azide characteristic signal at 8.0 and the integration of proton resonance at 4.2 ppm.

$^1$H NMR (300 MHz; DMSO-d6): δ (ppm)=8.0 (d, 2H aromatic ring, CH=CH—C—N$_3$), 7.3 (d, 2H aromatic ring, CH=CH—N$_3$), 5.1 (q, 1H, CO—CH—(CH$_3$)—O), 4.3 (m, 2H, O—CH$_2$—C—CH$_2$—O), 3.6 (s, 4H, CH$_2$—CH$_2$—O), 3.3 (m, 2H, O—CH$_2$—C—CH$_2$—O), 1.5 (t, 3H, CO—CH—(CH$_3$)—O). (FIG. 2b).

Experimental molecular weight calculated from the $^1$H NMR spectra ($\overline{Mn}$=18 600 g/mol) and dispersity of Đ=1.1 determined by SEC analysis showed that no degradation of the s-PLA copolymer occurred during the synthesis.

Figure 2:
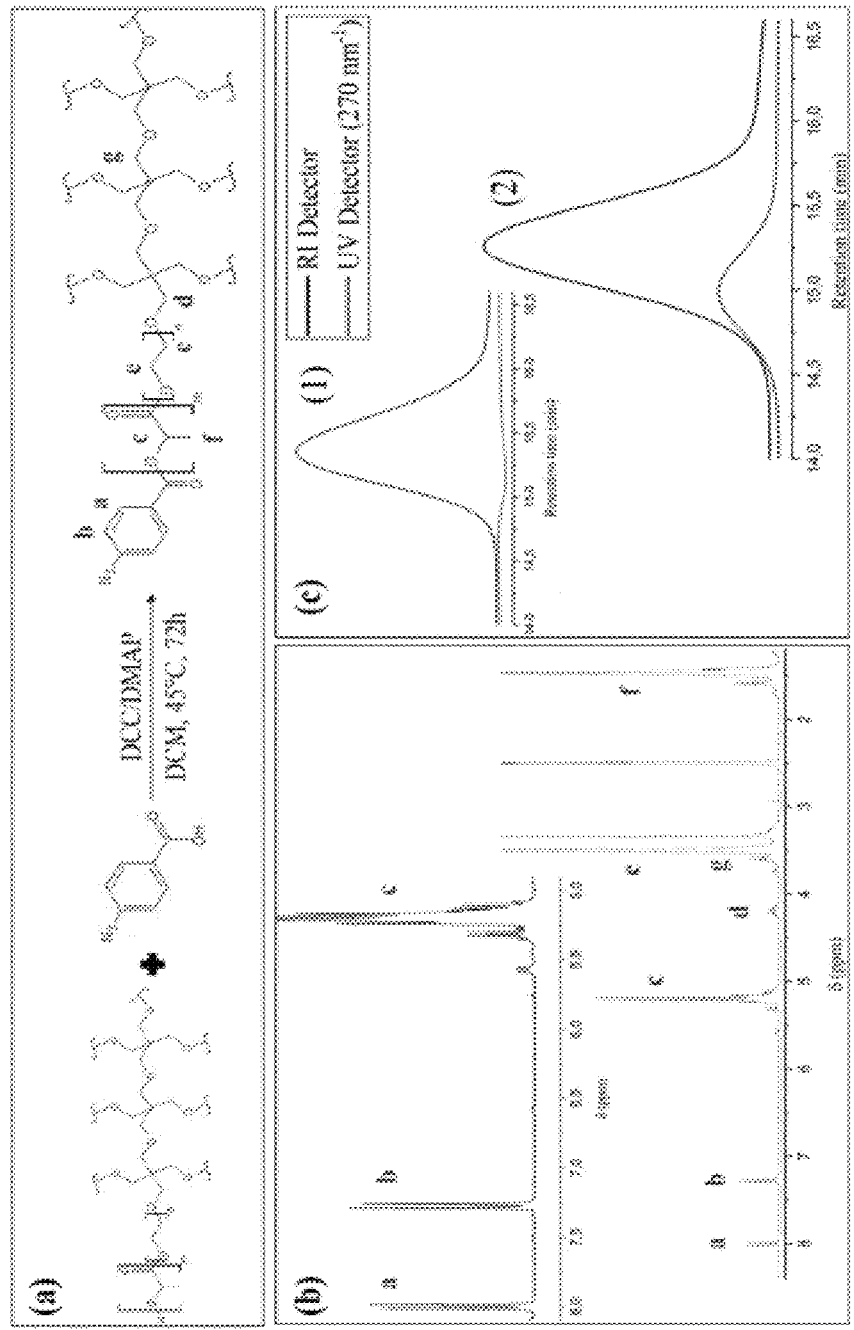
FIG. 2: (a) Synthetic scheme of the degradable copolymer photo-crosslinker $PEG_{8arm}10k\text{-}PLA_{94}\text{-}fN3$ (s-PLA-fN3); (b) $^1H$ NMR spectra of $PEG_{8arm}10k\text{-}PLA_{94}\text{-}fN3$ (s-PLA-fN$_3$); (c) SEC analysis of (1) $PEG_{8arm}10k\text{-}PLA_{94}$ and SEC analysis of (2) $PEG_{8arm}10k\text{-}PLA_{94}\text{-}fN3$. UV detector (270 $nm^{-1}$).

The grafting of 4-azidobenzoic acid onto s-PLA chain-ends was further confirmed by SEC analyses. After functionalization, a UV signal characteristic of aryl-azide groups (270 nm$^{-1}$) was visible at a retention time corresponding to the refractive index signal of the star copolymer (FIG. 2-c-2). This was not the case for the starting s-PLA copolymer (FIG. 2-c-1).

These results confirmed the successful chain-end functionalization of s-PLA with aryl-azide moieties, yielding the expected multi(aryl-azide) macromolecular photo-crosslinker s-PLA-fN$_3$.

1.5 Synthesis of the methacrylate-Functionalized PEG$_{8\ arm}$10k-PLA$_{50}$ 25 000 (S-PLA-25-MC), PEG$_{8arm}$10k-PLA$_{50}$ 50 000 (s-PLA-50-MC) and PEG$_{8arm}$10k-PLA$_{50}$ 100 000 (S-PLA-100-MC)

The 8-armed star copolymer PEG$_{8arm}$10k-PLA$_{50}$ ($\overline{Mn}_{theo}$=25 kg·mol$^{-1}$), PEG$_{8arm}$10k-PLA$_{50}$ ($\overline{Mn}_{theo}$=50 kg·mol$^{-1}$) or PEG$_{8arm}$10k-PLA$_{50}$ ($\overline{Mn}_{theo}$=100 kg·mol$^{-1}$) was solubilized in freshly distilled DCM (20% w/v). Triethylamine (5 eq./OH group) was added and the resulted mixture was cold to 0° C. Methacryloyl chloride (5 eq./OH group) was added with a casting ampoule, under stirring at 0° C. Once the addition is completed, the mixture was stirred at room temperature for 72 h in dark. Then, the product was filtered and then precipitated in cold diethyl ether. The methacrylate-functionalized PEG$_{8arm}$10k-PLA$_{50}$ (s-PLA-25-MC), PEG$_{8arm}$10k-PLA$_{50}$ (s-PLA-50-MC) or PEG$_{8arm}$10k-PLA$_{50}$ (s-PLA-100-MC) was solubilized in DCM and washed with basic aqueous phase, in the dark. The organic layer was concentrated under vacuum pressure to afford a concentrated solution which was precipitated in cold diethyl ether. The recovered product was then dried under reduced pressure.

The yield of functionalization was determined by NMR (95% of functionalization) s-PLA-25-MC:
$^1$H NMR (300 MHz; CDCl$_3$) δ (ppm)=6.2 (d, 1H, CO—C(CH$_3$)=CH$_2$), 5.6 (d, 1H, CO—C(CH$_3$)=CH$_2$), 5.1 (q, 1H, CO—CH—(CH$_3$)—O), 4.3 (m, 2H, C—CH$_2$—O), 3.6 (s, 4H, CH$_2$—CH$_2$—O), 3.3 (O—CH$_2$—C—CH$_2$—O), 2.0 (s, 3H, CO—C(CH$_3$)=CH$_2$), 1.5 (t, 3H, CO—CH—(CH)—O).

1.6 Synthesis of the acrylate-Functionalized PEG$_{8arm}$10k-PLA$_{50}$ (s-PLA-A)

The 8-armed star copolymer PEG$_{8arm}$10k-PLA$_{50}$ ($\overline{Mn}_{theo}$=25 kg·mol$^{-1}$) was solubilized in freshly distilled DCM (20% w/v). Triethylamine (15 eq./OH group) was added and the resulted mixture was cold to 0° C. Acryloyl chloride (15 eq./OH group) was added with a casting ampoule, under stirring at 0° C. Once the addition is completed, the mixture was heated at 45° C. for 72 h in dark. Then, the product was filtered and then precipitated in cold diethyl ether. The acrylate-functionalized PEG$_{8arm}$10k-PLA$_{50}$ (s-PLA-A) was solubilized in DCM and washed with basic aqueous phase, in the dark. The organic layer was concentrated under vacuum pressure, in dark at room temperature, to afford a concentrated solution which was precipitated in cold diethyl ether. The recovered product was then dried under reduced pressure.

1.7 Shaping of the Polymers and Photo-Crosslinking

Films by Solvent Evaporation

For elastomers crosslinked with 2,6-bis(4-azidobenzylidene)-4-methylcyclohexanone (BA), PLA$_{50}$PLU copolymers with defined molecular weights were stirred in DCM with 2,6-bis(4-azidobenzylidene)-4-methylcyclohexanone (BA) (2-5 wt % of the polymer).

For elastomers crosslinked with s-PLA-fN$_3$, PLA$_{50}$PLU copolymers with defined molecular weights were mixed with s-PLA-fN$_3$ at different weight ratios (10, 25 and 50 wt %) and stirred in DCM.

For control, the same protocol was followed by replacing s-PLA-fN$_3$ by the non-functional s-PLA.

For elastomer obtained starting from s-PLA-50-MC only (without other prepolymer), s-PLA-50-MC was dissolved and stirred in DCM. Photo-initiator 2,2-dimethoxy-2-phenylacetophenone (PI) can be added (at 2 wt % of the copolymer)

Solutions were dried out in an aluminum mold to obtain thin films. Films were stored in a dark place for 24 h. The resulting films were further dried under vacuum for 24 h.

Films by Press

The press was heated at 155° C. Then, the copolymer s-PLA-50-MC is in powder form is deposited on Teflon paper and heated to 155° C. and a pressure of 5-6 bar is applied for 10 minutes. After this step, the film of a few micrometers is placed in the freezer for 5 minutes.

Microfibers-Based Tissues by Electrospinning Process

Electrospun Polymer Solutions

Polymer blends $PLA_{50}PLU$ and $s\text{-}PLA\text{-}fN_3$ or s-PLA (90/10, 75/25 and 50/50 w/w noted 90/10, 75/25 an 50/50 in the rest of the text, respectively) were dissolved in DCM/DMF (50/50 v/v)[40]. Blend concentrations were chosen to produce fibers without beads (90/10: 14 wt %, 75/25: 18 wt %, 50/50: 22 wt %). All mixtures were mechanically stirred at room temperature overnight, until total dissolution.

The copolymer, s-PLA-50-MC or s-PLA-100MC was dissolved in a DCM/DMF solution (70/30 v/v) at a concentration of 35% by weight for s-PLA-100-MC and 40% by weight fors-PLA-50-MC. The polymer solution was mechanically mixed at room temperature overnight until it is completely dissolved.

Electrospinning Process

Electrospinning process was carried out with a horizontal syringe pump device. A high voltage power supply was set at 12-15 kV. Polymer solutions filled a 10 mL syringe with a 21-gauge needle (inner diameter 0.82 mm). Feed rate (1.8 mL/h for s-PLA-50-MC and s-PLA-100-MC and 2.1 mL/h the others polymers) was controlled with the syringe pump (Fresenius Vial Program 2 IEC). The collector was a square aluminum foil and located 15 cm from the needle tip. Experiments were performed at room temperature. The fibrous scaffold was collected after 40 minutes of electrospinning. It was dried overnight before further experiments.

A step of UV curing of the fibers is optionally achieved during the electrospinning process using UV LEDs. The UV curing is performed throughout electrospinning process.

The LEDs (365 and 385 nm) from the DYMAX QX4 controller are located at a distance of 8 cm from the collector. The LEDs have an intensity between 14 W·cm$^{-2}$ and 19 W·cm$^{-2}$. The ACCU-CAL 50-LED radiometer is used to measure the UV dose received by the samples.

Said step of UV curing of the fibers can also be achieved after the electrospinning process, also for a time of 2 min.

Photo-Crosslinking of Films

Films were irradiated under UV light (mercury or metal halide bulb) under inert atmosphere for different times (1 min<t<20 min) with a Dymax PC-2000 system (75 mW·cm$^-$$_2$). For sake of clarity, in the rest of the text a 10 minutes irradiation time corresponds to 5 minutes of irradiation per side of the film. The distance measured between the bulb and samples was 13.5 cm. Intensity of radiation doses was evaluated using ACCU-CAL™ 50 system. Later, elastomer films were cut, weighed and put in DCM (10 mL). After three washes, the insoluble crosslinked parts were removed from DCM and dried under vacuum during 24 h. Finally, samples were weighed to determine the gel fraction according to equation (4) below.

Photo-Crosslinking of Fibrous Scaffold

To guaranty low temperature inside the enclosure and maintain the morphology of the fibers, fibrous scaffolds were irradiated under UV light (mercury bulb) and inert atmosphere for 2 seconds at a frequency of 0.5 Hz. The sequential flashes were applied for determined periods using a Dymax PC-2000 system (75 mW·cm$^{-2}$). The distance, the intensity of irradiation and the gel fraction were measured using the protocol described for films.

3D Materials by Stereolithography

Synthesis of Copolymer Solution

The copolymer s-PLA-50-MC was dissolved in ethyl lactate at a concentration of 400 g/L. The photoinitiator Omnirad RPO-L was added to this solution at a concentration of 2% by weight. The resulting mixture was then mechanically stirred for 24 h.

Shaping Process

The desired structure is modeled by the OnShape software, then printed using the Phrozen Shuffle 3D printer. The polymer solution is irradiated layer by layer (2 min for 50 µm) using 405 nm (50 Watts) LEDs.

At the end of the printing process, the object undergoes a post-curing step using a FormLab-Form Cure: wavelength 405 nm, irradiation on both sides 5 min, at 45° C.

Gel fraction (=Crosslinking yield)

$$\text{Gel fraction (\%)} = \left(\text{Weight of insoluble cross-linked parts/Weight of initial sample}\right) * 100 \tag{4}$$

The gel fraction percentage value allows to evaluate the efficiency of the tested photo-crosslinker. The higher the gel fraction value, the more effective the photo-crosslinker is.

1.8 Mechanical Properties

Tensile mechanical tests were carried out on micro-fibers scaffold samples. Samples were cut (30×10 mm) and thickness was measured with a micrometer. Scaffolds were analyzed in triplicate at 37° C. (dry and hydrated state) with an Instron 3344 with a deformation rate of 10 mm/min. Young modulus (E, MPa), stress at yield ($\sigma_y$, MPa), strain at yield ($\varepsilon_y$,%), stress at break ($\sigma_{break}$, MPa) strain at break ($\varepsilon_{break}$,%) were expressed as the mean value of the three measurement.

1.9 Degradation Study of Fibrous Materials

Fibrous tests samples were cut (10×10 mm), weighed (Wi=initial weight) and placed in 5 mL of phosphate buffered saline (PBS) (pH 7.4) at a constant temperature (37° C.) under stirring. At different time points, fibrous materials were removed from PBS, weighed (Ww=weight of the wet samples), then dried to constant mass (Wx=weight dry after x time in PBS). The remaining mass of the samples was calculated from equation (5).

$$\text{Remaining mass(\%)}=(1-((Wi-Wx)/Wi))*100 \tag{5}$$

Water uptake was determined from equation (6)

$$\text{Water uptake(\%)}=((Ww-Wi)/Wi)*100 \tag{6}$$

1.10 Degradation Study of Films

The degradation of s-PLA-50-MC-based films was studied for one month. The films (L=2 mm and l=0.5 mm) were weighed (Wi=Initial mass) then introduced into a PBS solution (pH=7.4) and agitated at 37° C. At different times (3, 8, 15, 15, 22 and 30 days), the films are recovered, weighed (Ww=Wet Mass) and dried for 24 hours. The films are then weighed again (Wd=Dry mass) and introduced into a DCM solution. After three washes, the samples are dried overnight and weighed (Wcd=cross-linked dry mass). Thus, during this degradation, the conservation of the mass of the material, the absorption of water and the conservation of chemical bridges are evaluated according to the following respective equations:

$$\text{Remaining mass (\%)} = \left(1 - \left((Wi - Wd)/Wi\right)\right) * 100 \quad (5)$$

$$\text{Water uptake (\%)} = \left((Ww - Wi)/Wi\right) * 100 \quad (6)$$

$$\text{Remaining chemical bridges (\%)} = \quad (7)$$

$$\left(1 - (\text{gel fraction}(i) - \text{gel fraction}(m))/\text{gel fraction}(i)\right) * 100$$

where gel fraction (i) is the initial gel fraction and gel fraction (m) is the fraction at different times. As a reminder, $$\text{gel fraction(\%)} = \left(\frac{Wcd}{Wi}\right) * 100 \quad (8)$$

1.11 Cytotoxicity Assay

Cells and control polymer films were chosen in accordance with ISO 10993-5 guidelines. Mouse fibroblasts L929 cells (ECACC 85011425) were maintained in DMEM high glucose supplemented with 5% Fetal Bovine Serum (FBS), 2 mM L-glutamine and 1% penicillin/streptomycin and cultured at 37° C. and 5% CO2. Cells were tested to be free of mycoplasms. Negative (RM-C High Density Polyethylene noted C−) and positive (RM-B 0.25% Zinc DiButyldithioCarbamate (ZDBC) polyurethane noted C+) control films were purchased from Hatano Research Institute (Ochiai 729-5, Hadanoshi, Kanagawa 257, Japan). Cytotoxicity was assessed on extracts. First, extractions were carried out at 0.1 g per mL for 72 h at 37° C. under sterile conditions on complete growth medium following ISO 10993-12 recommendations. L929 cells were seeded at $15.10^3$ cells per well in a 96-well plate and allowed to attach overnight. The culture medium was then removed and discarded from the cultures and an aliquot of the fibers extract was added into each well. Aliquots of the blank, negative and positive controls were added into additional replicate wells (n=9). After 24 h incubation under appropriate atmosphere, extract's cytotoxicity was assessed by Lactate Dehydrogenase (LDH) assay (Pierce), according to the manufacturer's instruction. Briefly, medium from well was transferred to a new plate and mixed with LDH Reaction Mixture. After 30 minutes of incubation at room temperature, absorbances at 490 nm and 680 nm were measured using a CLARIOstar@ microplate-reader (BMG LABTECH's) to determine LDH activity.

The percentage of cytotoxicity were calculated from equation (7)

$$\text{Cytotoxicity(\%)} = (((\text{sample LDH activity}) - \text{LDH}-)/(\text{LDH}+ - \text{LDH}-)) * 100 \quad (9)$$

Where "LDH−" represents Spontaneous LDH Release Control (water-treated) and "LDH+" Maximum LDH Release Control activity obtained after cell lysis.

2. Results and Discussion

2.1 Evaluation of bis(aryl-azide) from the Prior Art as Photo-Crosslinker

In order to prepare degradable elastomeric biomaterials starting from non-functional polyesters, we first focused on the triblock PLA$_{50}$-Pluronic®-PLA$_{50}$ (PLA$_{50}$PLU). Targeted and experimental molecular weights (50 000, 100 000 and 200 000 g·mol$^{-1}$) were in agreements based on $^1$H NMR spectra. Dispersities between 1.5 and 1.8 were determined by SEC analysis, which is in agreement with values classically obtained for the ROP of high molecular weight polyesters.

Figure 3:
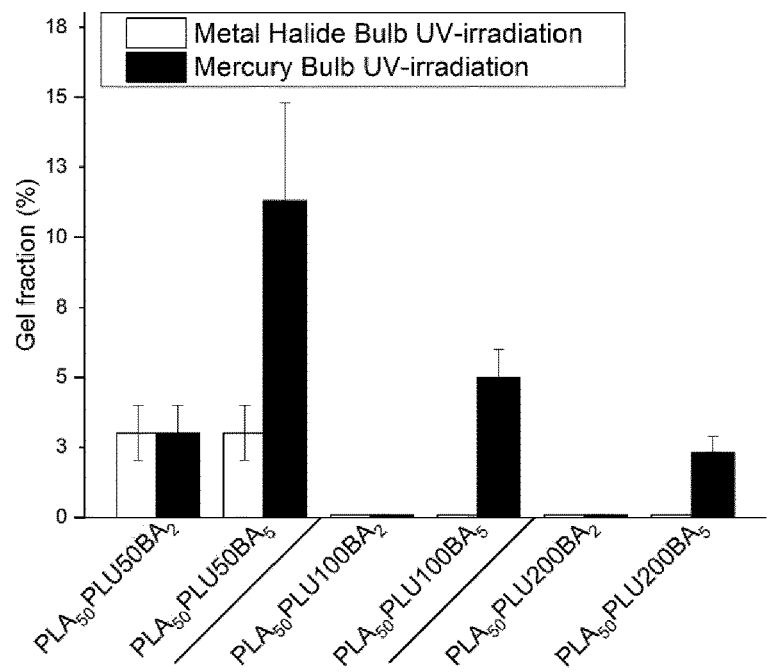
FIG. 3: Influence of the type of UV-bulb (MB vs. MHB) used to generate the elastomers evaluated by the gel fraction analysis.
Figure 4:
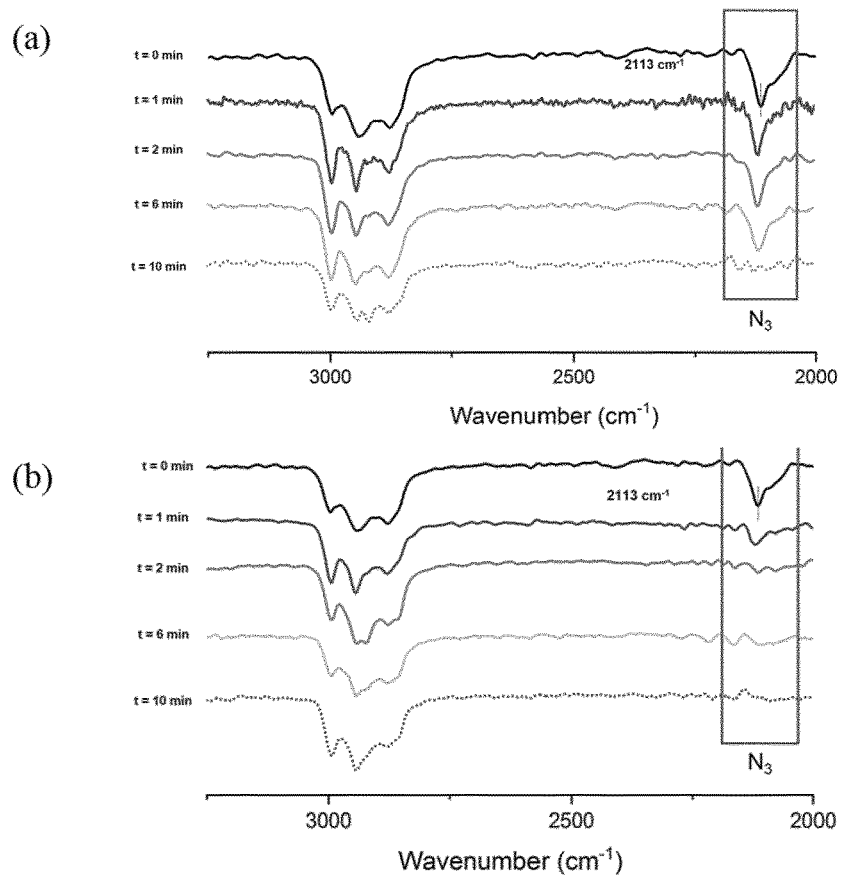
FIG. 4: FTIR analysis of scaffolds before and after UV irradiation at different time with two different UV-bulb: (a) Metal Halide Bulb and (b) Mercury Bulb. The photoactivation of aromatic bis(aryl-azide) generating nitrene was showed by the loss of the characteristic azide IR band located at 2110 cm-1.

These Copolymers were Further Used to Evaluate the Real Potential of 2,6-bis(azidobenzylidene)-4-methylcyclohexanone (BA) from the Prior Art as Photo-Crosslinker The three different triblock copolymers PLA$_{50}$PLU50, PLA$_{50}$PLU100 and PLA$_{50}$PLU200 were mixed with BA, at different concentration of BA (2 wt % and 5 wt %). Gel fractions results (FIG. 3) showed low crosslinking efficiency using BA as photo-crosslinker (gel fraction <15%) despite a proven activation of aryl-azide. This was evidenced through the disappearance of the band at 2100 nm$^{-1}$, which is characteristic of the azide group (FIG. 4).

This lack of crosslinking despite aryl-azide photoactivation was attributed to the formation of azo-dimers and termination reactions that do not allow crosslinking. Furthermore, molecular weight of the prepolymer PLA$_{50}$PLU copolymer did not influence significantly the crosslinking efficiency compared to nature of the UV-bulb used (metal halide bulb versus mercury bulb) and BA concentration. As expected, gel fraction increased with mercury bulb and higher BA concentration (5% wt).

Taking into account these results, we hypothesized that the limited functionality of BA (2 aryl-azide groups) associated to the direct proximity of the reactive groups on this small organic molecule could explain the poor outcome of BA-based crosslinking.

2.2 Degradable Elastomers Photo-Crosslinked by s-PLA-fN3 Shaped as Films

Influence of the PLA$_{50}$PLU Prepolymer Molecular Weight and the Content of s-PLA-fN3 on the Crosslinking Efficiency To evaluate the potential of s-PLA-fN3 for the preparation of degradable elastomeric biomaterials, we first focused on the influence of the PLA$_{50}$PLU molecular weight and the content of s-PLA-fN3 on the crosslinking efficiency. Based on the study carried out on bis(aryl-azide) photo-crosslinker, films having a thickness of 20 µm were prepared from PLA$_{50}$PLU(50-200)/s-PLA-fN3 blends at various compositions (90/10, 75/25 and 50/50 w/w) prior to irradiation under UV-light for period 10 minutes (5 minutes for each side). Results are summarized in FIG. 5.

As expected, the initial content of s-PLA-fN3 in the mixture had a strong influence on the crosslinking efficiency with gel fractions around 15%, 35% and 55% when s-PLA-fN3 ratios varied from 10 wt %, 25 wt % and to 50 wt %, respectively. On the opposite, the molecular weight of the PLA$_{50}$PLU did not show any significant impact on the crosslinking efficiency. For a defined weight ratio of PLA$_{50}$PLU (50-200)/s-PLA-fN3 gel fractions were similar whatever the PLA$_{50}$PLU molecular weight. At the temperature of UV crosslinking, chain mobility is higher for PLA$_{50}$PLU50 compared to PLA$_{50}$PLU200 but this higher mobility does not seem to significantly impact the crosslinking efficiency. Only at a 50/50 ratios, a slightly lower gel fraction was obtained for the PLA$_{50}$PLU50 compared to PLA$_{50}$PLU100 or PLA$_{50}$PLU200. This result might be due to a lower chain entanglement combined with higher chain mobility that partly prevent reaction between the active nitrene species and the polymeric chains.

Kinetics of the Photo-Crosslinking

Figure 5:
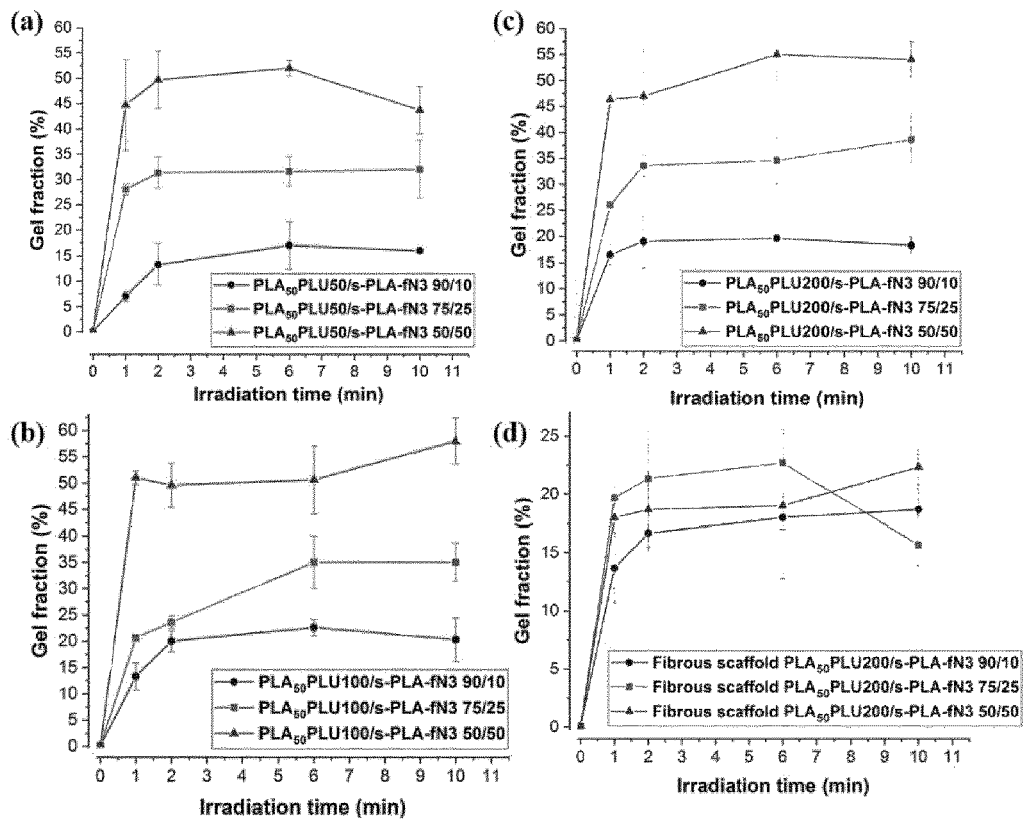
FIG. 5: Crosslinking kinetics of the elastomers $PLA_{50}PLU(50\text{-}200)/s\text{-}PLA\text{-}fN3$ evaluated by gel fraction. (a) $PLA_{50}PLU50/s\text{-}PLA\text{-}fN3$; (b) $PLA_{50}PLU100/s\text{-}PLA\text{-}fN3$; (c) $PLA_{50}PLU200/s\text{-}PLA\text{-}fN3$; (d) Crosslinking kinetics of the elastic microfibers scaffolds $PLA_{50}PLU$ (50-200)/s-PLA-fN3 evaluated by gel fraction. (Data are expressed as means±SD and correspond to measurements with n=3).

Kinetics of the photo-crosslinking were then followed over a 10 minutes period of time (FIG. 5). After 2 minutes of UV-irradiation, the maximum gel fraction was already reached for most $PLA_{50}PLU$/s-PLA-fN3 blends, which confirmed that aryl-azide photo-crosslinking is a very fast process, whatever the molecular weight of the $PLA_{50}PLU$ copolymer.

Figure 6:
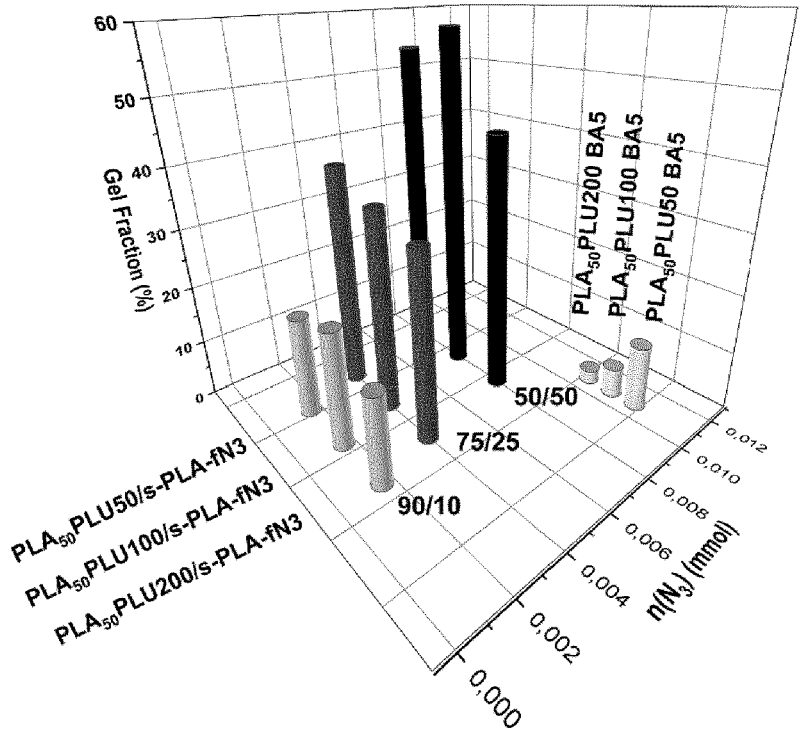
FIG. 6: Gel fraction as a function of the nature of the aryl-azide photo-crosslinker (s-PLA-fN3 at 10, 25 and 50 wt % vs. BA at 5 wt %) and the overall content of aryl-azide groups in the blend (n(N3)) (10 minutes irradiation time).

Comparison of the BA (Prior Art) and s-PLA-fN3 Efficiencies as Photo-Crosslinkers Finally, the crosslinking efficiency of molecular bis(aryl-azide) photo-crosslinker BA and macromolecular multi (aryl-azide) photo-crosslinker s-PLA-fN3 with respect to the overall aryl-azide groups concentration in the blends were compared (FIG. 6).

It is to note that the concentration of aryl-azide groups was higher in $PLA_{50}PLU$ (50-200)-BA5 mixtures (5 wt % of BA, 11 μmol) than in all $PLA_{50}PLU$/s-PLA-fN3 blends even when the highest concentration of s-PLA-fN3 (50 wt %, 8 μmol) was used. However, gel fractions obtained were higher with macromolecular 8-branched star photo-crosslinker than BA, even for the lowest content of s-PLA-fN3 (10 wt %, ca. 2 μmol), which corresponds to 5.5 times less photo-reactive moieties compared to 5 wt % of BA.

As expected, with 8 aryl-azide groups present on the s-PLA-fN3 star macromolecular photo-crosslinker, active nitrene species have more probability to be in contact with the $PLA_{50}PLU$ polymeric chain and to act as a crosslinking agent than the bi-functional BA. Moreover, reducing the mobility of the cross-linking agent due to its macromolecular nature and expected chains entanglement may also explain this enhanced efficiency of crosslinking.

2.3 Micro-Scale Scaffolds Using Aryl-Azide Star-Shaped s-PLA-fN3 as Photo-Crosslinker Based on the results obtained on films $PLA_{50}PLU$(50-200) that demonstrated a high potential of s-PLA-fN3 as photo-crosslinker, the next step was to evaluate the transferability of this approach into the electrospinning process to produce elastomeric and degradable scaffolds based on photo-crosslinked fibers. Having shown that the molecular weight of the $PLA_{50}PLU$ copolymer does not influence the outcome, this next study was limited to $PLA_{50}PLU200$ that proved to be easily electrospun. The same ratios of $PLA_{50}$-PLU200/s-PLA-fN3 (90/10, 75/25 and 50/50) were produced as described in the experimental section. Resulting scaffolds had a thickness of nearly 250 μm. To guaranty low temperature inside the enclosure (see experimental section and FIG. 6 for more details) and maintain the morphology of the fibers, fibrous scaffolds were irradiated under UV light (mercury bulb) and inert atmosphere for 2 seconds at a frequency of 0.5 Hz. Various parameters have been investigated and are discussed in the following sections.

Fibers Morphology

Figure 7:
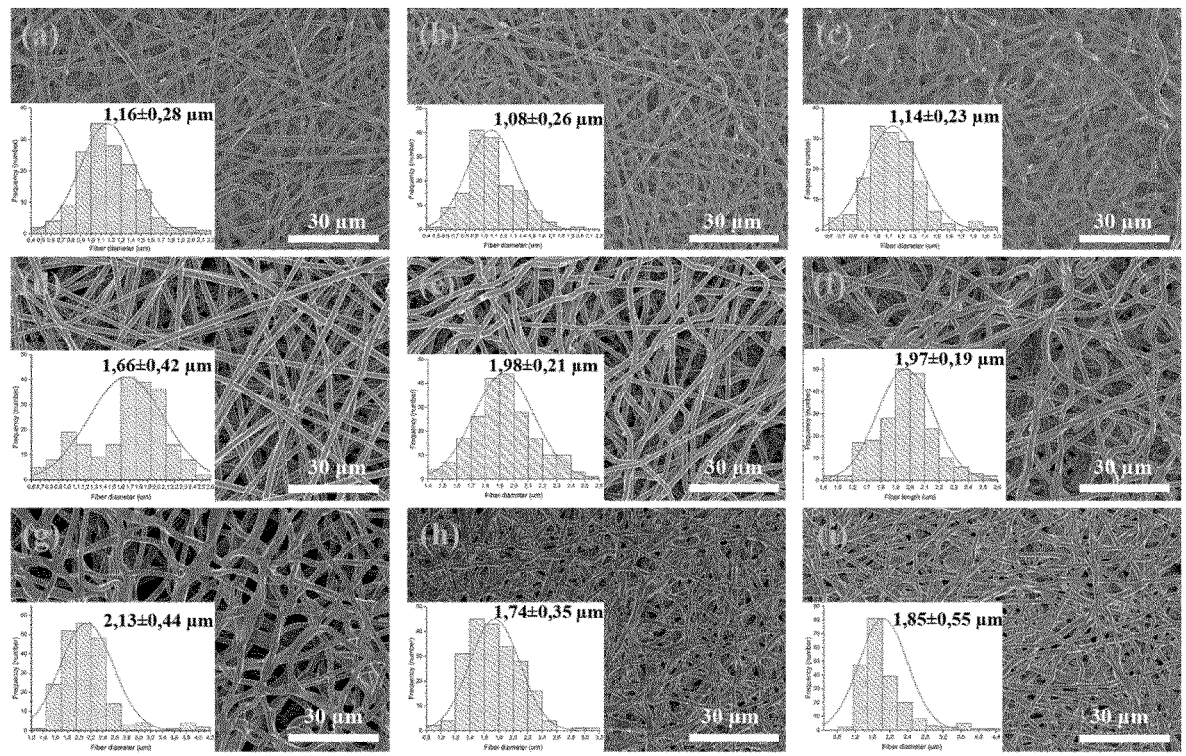
FIG. 7: SEM images, microfiber diameter distributions of the different scaffolds based on $PLA_{50}\text{-}PLU200/s\text{-}PLA$ and $PLA_{50}\text{-}PLU200/s\text{-}PLA\text{-}fN3$ (before and after 2 min of UV curing). Scale bar of SEM is 30 μm. (a) $PLA_{50}\text{-}PLU200/s\text{-}PLA$ 90/10; (b) $PLA_{50}\text{-}PLU200/s\text{-}PLA\text{-}fN3$ 90/10 uncured; (c) $PLA_{50}\text{-}PLU200/s\text{-}PLA\text{-}fN3$ 90/10 UV-cured; (d) $PLA_{50}\text{-}PLU200/s\text{-}PLA$ 75/25; (e) $PLA_{50}\text{-}PLU200/s\text{-}PLA\text{-}fN3$ 75/25 uncured; (f) $PLA_{50}\text{-}PLU200/s\text{-}PLA\text{-}fN3$ 75/25 UV-cured; (g) $PLA_{50}\text{-}PLU200/s\text{-}PLA$ 50/50; (h) $PLA_{50}\text{-}PLU200/s\text{-}PLA\text{-}fN3$ 50/50 uncured; (i) $PLA_{50}\text{-}PLU200/s\text{-}PLA\text{-}fN3$ 50/50 UV-cured.

Fibers morphology was analyzed by SEM an typical images are shown in FIG. 7. For a defined ratio, no difference in fiber diameter distribution was noticed between fibers based on s-PLA or s-PLA-fN3 even after UV-curing. In brief, all fiber diameters were in the range of 1 to 2 μm. The lowest fibers diameter (1.2 μm) was obtained with $PLA_{50}$-PLU200/s-PLA-fN3 90/10 blends and increased with the content of s-PLA-fN3 with fiber diameters of 1.65-1.98 μm and 1.74-2.13 μm for 75/25 and 50/50 blends, respectively. However, fiber distribution was more heterogeneous for the latter. It might be due to a non-total solvent evaporation that cause flatten fibers leading to interconnected fibers.

In-Situ Photo-Crosslinking Evaluation

In order to determine optimal UV-curing time to obtain an elastic micro-fibers scaffold, crosslinking study was conducted. Fibrous scaffolds based on $PLA_{50}PLU200$/s-PLA-fN3 under UV light (mercury bulb) and inert atmosphere for 2 seconds at a frequency of 0.5 Hz. After 2 minutes of UV-irradiation, the gel fraction obtained was maximal (20-25%) (FIG. 5-$d$). This irradiation time was therefore selected for the rest of the studies. Values of gel fraction were lower for fibrous scaffolds (20-25%) than that of 20 μm films (15-65%). This may be due to both the thickness, ca. 250 μm, and opaque nature of the highly porous scaffolds, which may restrict UV penetration to few microns at the surface of the scaffolds. Considering UV barrier properties of aryl-azide compounds combined with s-PLA-fN3 polymer crystallinity, UV light might photo-cured fibers only on surface (few micrometers). Hence, no significant difference between fibrous scaffolds regardless of s-PLA-fN3 concentrations was noticed.

Mechanical Properties A major challenge in the field of synthetic resorbable materials, dedicated to soft tissue reconstruction, is to ensure the mechanical properties preservation of the biomaterial/host tissues complex over degradation and healing processes. Therefore, $PLA_{50}$-PLU200/s-PLA-fN3 mechanical behaviors were evaluated under dry and hydrated state at 37° C. (Table 1).

TABLE 1

Elastic microfibers scaffolds (FS) mechanical properties in the dry and hydrated state at 37° C. Young's modulus (E), ultimate stress ($\sigma_{break}$), ultimate strain ($\varepsilon_{break}$), and elastic limit ($\varepsilon_y$). (Data are expressed as means ± SD and correspond to measurements with n = 3).

| Fibrous scaffolds blends | Dry state | | | | Hydrated state | | | |
| --- | --- | --- | --- | --- | --- | --- | --- | --- |
| | E (MPa) | $\varepsilon_y$ (%) | $\sigma_{break}$ (MPa) | $\varepsilon_{break}$ (%) | E (MPa) | $\varepsilon_y$ (%) | $\sigma_{break}$ (MPa) | $\varepsilon_{break}$ (%) |
| PLA50PLU200/ S-PLA-fN3 90/10 | 0.7 ± 0.1 | 12 ± 1 | 0.6 ± 0.1 | 174 ± 26 | 15.9 ± 1.5 | 5 ± 1 | 1.7 ± 0.2 | 117 ± 14 |
| PLA50PLU200/ S-PLA-fN3 75/25 | 0.3 ± 0.1 | 182 ± 4 | 1.4 ± 0.3 | 333 ± 68 | 10.6 ± 1.0 | 3 ± 0 | 1.4 ± 0.1 | 176 ± 16 |
| PLA50PLU200/ S-PLA-fN3 50/50 | 0.2 ± 0.0 | 115 ± 10 | 0.6 ± 0.0 | 257 ± 32 | 6.6 ± 2.3 | 3 ± 0 | 0.9 ± 0.2 | 89 ± 21 |
| PLA50PLU200/ S-PLA 90/10 | 11.6 ± 2.5 | 3 ± 1 | 1.0 ± 0.1 | 120 ± 13 | 18.4 ± 4.5 | 3 ± 1 | 1.7 ± 0.4 | 101 ± 14 |

TABLE 1-continued

Elastic microfibers scaffolds (FS) mechanical properties in the dry and hydrated state at 37° C. Young's modulus (E), ultimate stress ($\sigma_{break}$), ultimate strain ($\varepsilon_{break}$), and elastic limit ($\varepsilon_y$). (Data are expressed as means ± SD and correspond to measurements with n = 3).

| Fibrous scaffolds blends | Dry state | | | | Hydrated state | | | |
|---|---|---|---|---|---|---|---|---|
| | E (MPa) | $\varepsilon_y$ (%) | $\sigma_{break}$ (MPa) | $\varepsilon_{break}$ (%) | E (MPa) | $\varepsilon_y$ (%) | $\sigma_{break}$ (MPa) | $\varepsilon_{break}$ (%) |
| PLA50PLU200/ S-PLA 75/25 | 29.3 ± 1.3 | 1 ± 0 | 2.1 ± 0.3 | 171 ± 28 | 34.2 ± 14.6 | 1.7 ± 1 | 1.9 ± 0.3 | 97 ± 6 |
| PLA50PLU200/ S-PLA 50/50 | 2.4 ± 0.9 | 7 ± 2 | 1.2 ± 0.2 | 146 ± 11 | 5.6 ± 0.3 | 3 ± 1 | 0.7 ± 0.0 | 93 ± 9 |

In a dry state at 37° C., non UV-cured fibrous scaffolds based on PLA$_{50}$PLU200/s-PLA the 75/25 ratio had the lower deformability with a high Young modulus (E=29.3 MPa) and a low elastic limit ($\varepsilon_y$=1.3%). The 50/50 ratio on the opposite was the most deformable material (E=2.4 MPa and $\varepsilon_y$=7.3%). Fiber diameters in the observed range (ca. 1-2 μm) did not influence mechanical properties. On the other hand, in a dry state at 37° C., UV-cured fibrous scaffolds based on PLA$_{50}$PLU200/s-PLA-fN3 showed higher elastic properties (E=0.22-0.68 MPa and $\varepsilon_y$=12-182%) than non UV-cured fibrous scaffolds (E=2.44-29.3 MPa and $\varepsilon_y$=1.3-7.3%). A remarkable increase of elastic limit was therefore obtained thanks to the fibers crosslinking with quasi-linear stress-strain curves (FIG. 7). It yielded scaffolds with lower ultimate stress (0.58-1.38 MPa for crosslinked FS vs. 1.01-2.01 MPa for the non-crosslinked) and much higher ultimate strain (174-333% vs. 120-146%). As expected, FS PLA$_{50}$PLU200/s-PLA-fN3 75/25 and 50/50 showed higher elastic properties (E=0.22-0.34 MPa; $\varepsilon_y$=115-182%) than 90/10 (E=0.68 MPa; $\varepsilon_y$=12%) confirming the interest of using the star-shaped macromolecular s-PLA-fN3 photo-crosslinker. It is to note that for similar crosslinking efficiencies (FIG. 5-d), highest elasticity and ultimate stress were reached with FS PLA$_{50}$PLU200/s-PLA-fN3 75/25. It may be explained by the combination of efficient crosslinking and good balance between long and short polymer chains.

Figure 8:
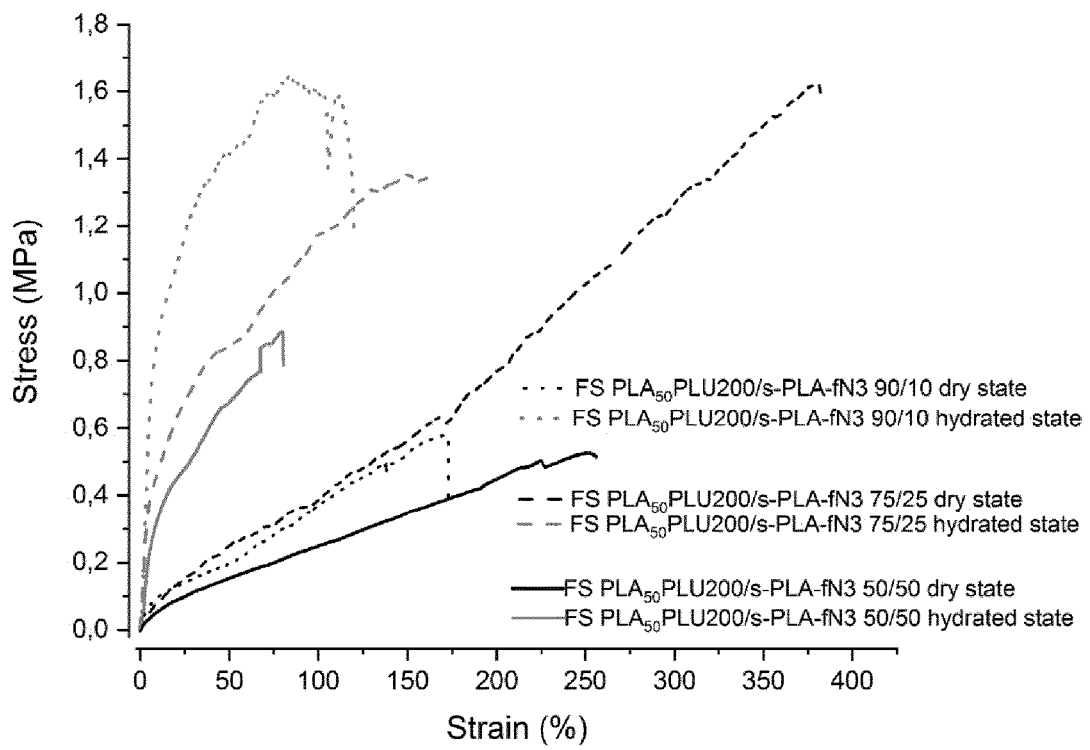
FIG. 8: Mechanical tensile properties of UV-cured fibrous scaffolds based on $PLA_{50}\text{-}PLU200/s\text{-}PLA\text{-}fN3$ in hydrated and dry state at 37° C.

In the hydrated state at 37° C., Young's modulus and ultimate stress of fibrous scaffolds were always higher than in dry state, whereas elastic limit and ultimate strain were lower than in dry state (FIG. 8). This may appear counter-intuitive considering the well-known plasticizing effect of water However, these results could be assigned to microphase separation phenomena that have recently been reported in literature for PLA-b-PEG-b-PLA copolymers. In more details, PEG blocks (more flexible, lower transition temperature) have an initial role of plasticizer for the blend, but PEG segments a prone to migration upon water uptake, which results microphase separation and stiffening. In our case, due to the core-shell structure of the crosslinked fibers (crosslinked shell, uncrosslinked core see degradation), this phenomenon may overshadow the impact of the crosslinking in the hydrated state.

Degradation

Figure 9:
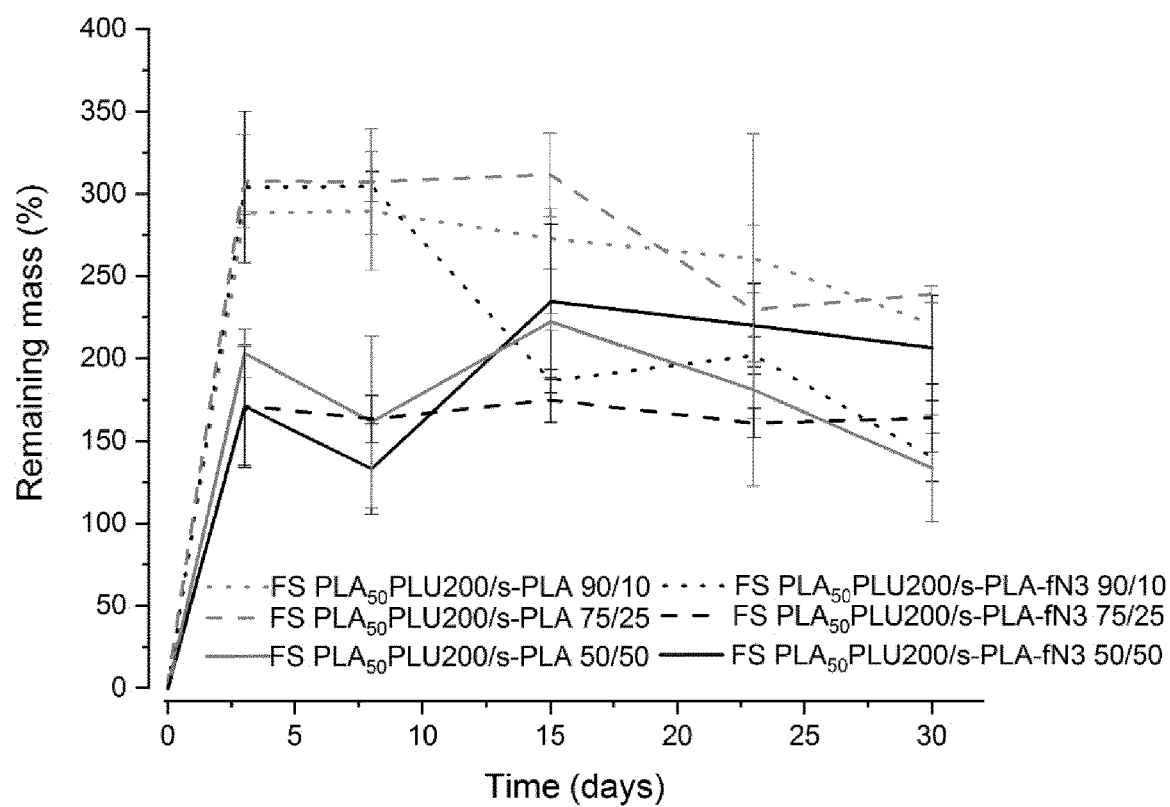
FIG. 9: Water uptake of fibrous scaffolds based on $PLA_{50}\text{-}PLU200/s\text{-}PLA$ or $PLA_{50}\text{-}PLU200/s\text{-}PLA\text{-}fN3$ at different ratios.
Figure 10:
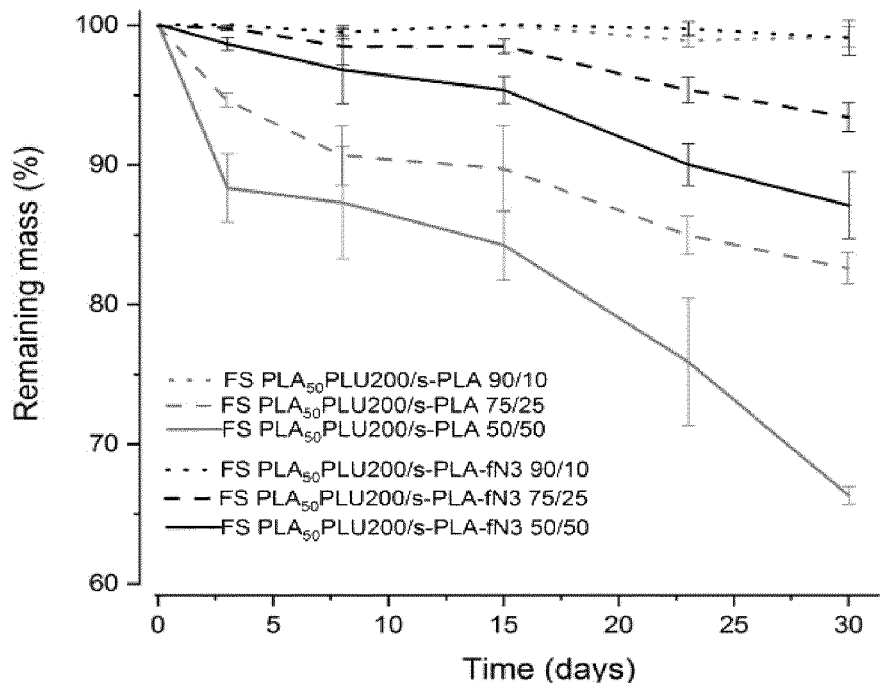
FIG. 10: Evaluation of scaffold degradation (a) remaining mass during degradation time for fibrous scaffolds in PBS at 37° C. Data correspond to measurement in triplicate; (b) SEM images of $PLA_{50}\text{-}PLU200/s\text{-}PLA$ or $PLA_{50}\text{-}PLU200/s\text{-}PLA\text{-}fN3$ 50/50 over degradation time in PBS at 37° C., magnifications ×5000. (Data are expressed as means±SD and correspond to measurements with n=3).
Figure 10:
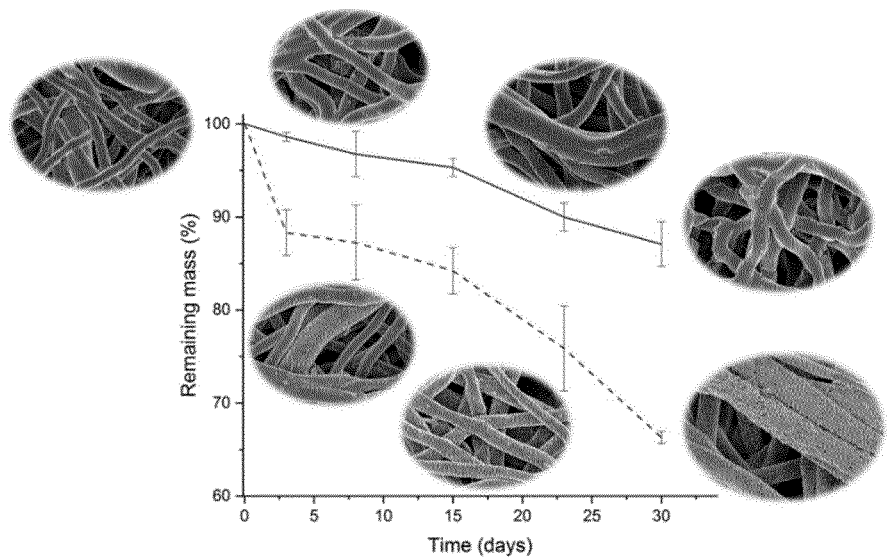

Scaffolds degradation was followed over 1 month (FIG. 10-a). As expected, non-crosslinked fibrous scaffolds showed a faster degradation (remaining mass from 65% to 85%) compared to their crosslinked counterparts (remaining mass from 90% to 95%). Only FS with high content of PLA$_{50}$-PLU200 (90/10) exhibited similar degradation profiles with almost no degradation over 1 month (weight loss <2%). It was also observed that the higher star copolymer (s-PLA and s-PLA-fN3) content, the faster the weight loss. This is due to the hydrophilic segments of PEG that favor water uptake (FIG. 9) of FS (150-300%), which promotes their hydrolytic degradation. Interestingly, degradation profiles of all crosslinked fibers were quasi-linear as expected for chemically crosslinked elastomers. Another difference between crosslinked and non-crosslinked fibers was the additional erosion observed for the latter. This phenomenon is illustrated by the SEM pictures presented in FIG. 10b. The absence of erosion upon degradation for the FS PLA$_{50}$-PLU200/s-PLA-fN3 50/50 despite weight loss (10% after 1 month) partly confirms the core-shell structure. In fact, crosslinked networks are known to maintain their 3D shape over degradation, which is observed here. While non- or less-crosslinked core chains degrade, their diffusion through the crosslinked shell is impeded, which results in a slower weight loss. Thus, UV-curing of the electropsun fibrous scaffolds allows one to modulate the degradation profile and may be useful to fit the properties of the scaffolds in the frame of soft-tissue engineering applications.

Cytocompatibility Study

Finally, following the mechanical and degradation studies of the fibrous scaffolds, one last mandatory step to validate their potential for use with cells is the validation of their cytocompatibility. The different copolymers PLA, PluronicF127 and PEG have already been approved by FDA. However, residual unreacted s-PLA-fN3 inside fibers may leach out from the fibers. For this reason, the cytotoxicity of the scaffolds was assessed on extracts following ISO 10993-12 recommendations. The extracts from scaffolds, C– and C+ were added on L929 fibroblasts seeded into wells and cytotoxicity was evaluated over a 24 hours period.

Figure 11:
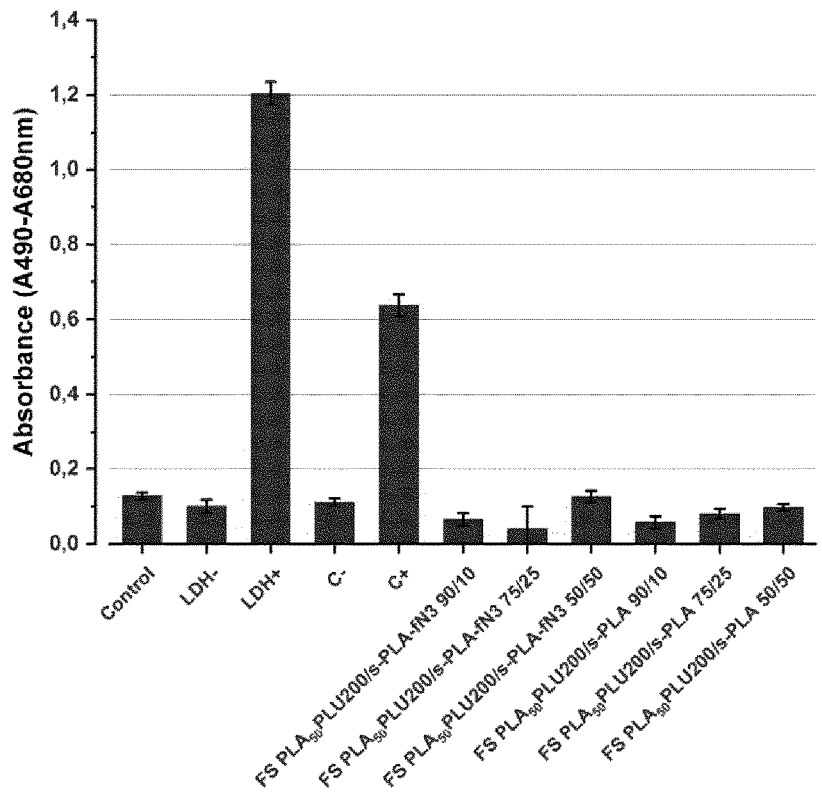
FIG. 11: Cytotoxicity assessed on L929 cells after treatment with extracts of fibrous scaffolds based on $PLA_{50}\text{-}PLU200/s\text{-}PLA$ or $PLA_{50}\text{-}PLU200/s\text{-}PLA\text{-}fN3$ at different ratios for 24 h. (Data are expressed as means±SD and correspond to measurements with n=9 per condition).

Only extracts from positive control films (C+) gave around 45-50% of cytotoxicity on L929 cells. Results (summarized on FIG. 11) show the absence of cytotoxicity of the extracts in contact with L929 cells even with extracts from the scaffolds containing the highest s-PLA-fN3 concentration (50/50). Thus, this preliminary assay confirmed the potential of the proposed degradable elastomeric biomaterials for cell-contacting applications, whose cytocompatibility will be further investigated in future dedicated work.

2.4 Versatility of s-PLA-fN$_3$ as Photo-Crosslinker

In order to highlight the broad applicability of the proposed strategy and the versatility of the multi(aryl-azide) s-PLA-fN$_3$ as a crosslinker, non-functional polymers with high molecular weight were selected among various families including polyesters (PLA$_{50}$), polyethers (PEO) and poly (methacrylate)s (PMMA). Gel fractions in the range 45 to 70% (Table 2) confirmed that crosslinking can be obtained whatever the polymer nature and despite high molecular weights.

TABLE 2

Influence of the nature of the polymer on the crosslinking efficiency evaluated by gel fraction analyses (s-PLA-fN$_3$ used as the crosslinker, 20 µm thick films, mercury bulb, 5 minutes UV-irradiation per side). (Data are expressed as means ±SD and correspond to measurements with n = 3).

| Polymers | Molecular weight (g · mol$^{-1}$) | % wt of s-PLA-fN$_3$ | n(N$_3$) in the film (µmol) | Gel fraction (%) |
|---|---|---|---|---|
| PLA$_{50}$PLU | 200 000 | 50 | 8 | 54 ± 4 |
| PLA$_{50}$ | 200 000 | 50 | 8 | 53 ± 5 |
| PEO | 300 000 | 50 | 8 | 73 ± 2 |
| PMMA | 350 000 | 50 | 8 | 45 ± 3 |

2.5 Degradable Elastomers Photo-Crosslinked by s-PLA-MA Shaped as Films

The methacrylate-functionalized star copolymer s-PLA-MA was shaped as films using press or by means of solvent evaporation according to the methods described above. The films were then irradiated with UV light as described in point 1.7.

Gel Fractions

Figure 12:
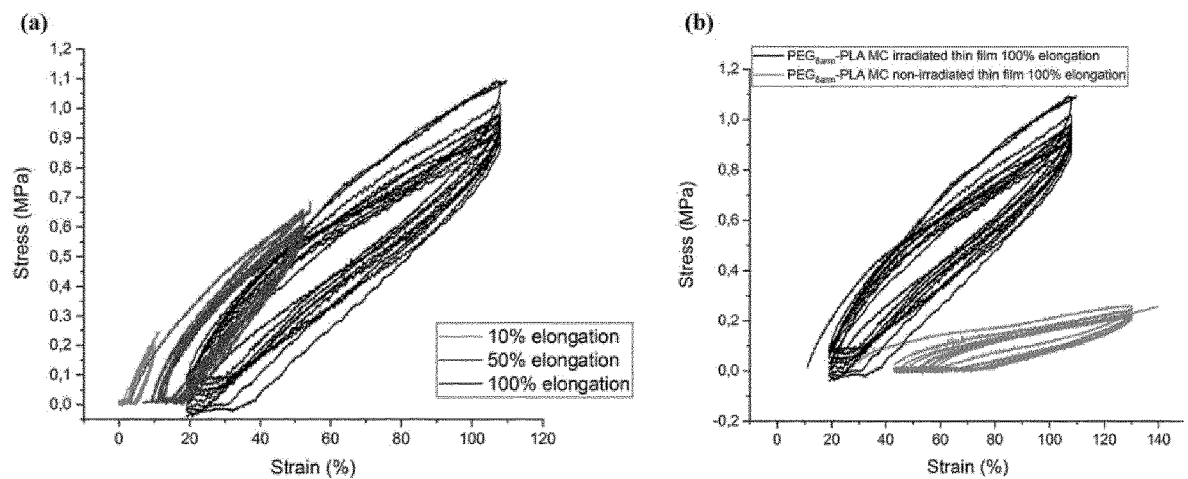
FIG. 12: Stress-strain curves for films based on PEG(s-PLA-MC Mn=50 000 g·mol-1 (a) films prepared by hot melt press after UV irradiation, analyses carried out at 37° C., at 10, 50 and 100% strain (10 cycles); (b) comparison of films prepared by hot melt press after UV irradiation versus without UV irradiation, analyses carried out at 37° C., at 100% strain (10 cycles).
Figure 13:
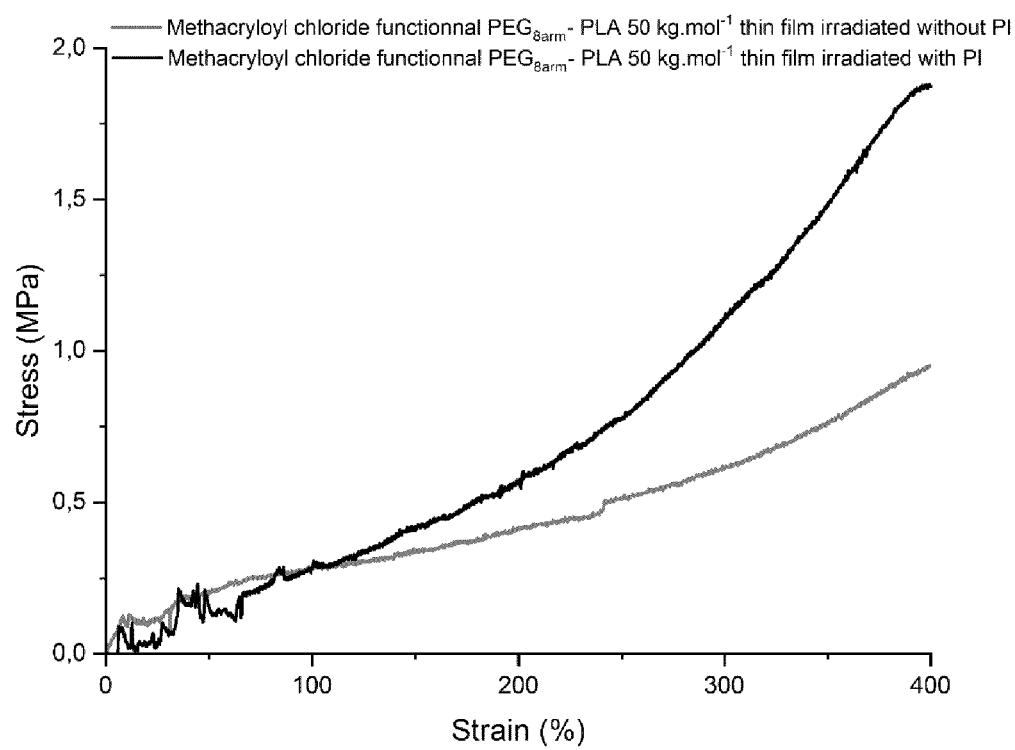
FIG. 13: Stress-strain curves (at 37° C.) for elastomers based on s-PLA-MC Mn=50 000 g·mol-1 in the presence or absence of photo-initiator (PI, in this case 2,2 dimethoxy-2-phenylacetophenone).

The gel fractions, calculated according to equation (4), of the crosslinked elastomers films are summarized in Table 3 (see also FIGS. 12 and 13).

TABLE 3

Gel fraction of the crosslinked elastomer films

| Elastomer film | Gel fraction (%) |
|---|---|
| s-PLA-MC (by press) | 78 ± 4 |
| s-PLA-MC (by solvent evaporation) | 92 ± 1 |

Degradation

Figure 14:
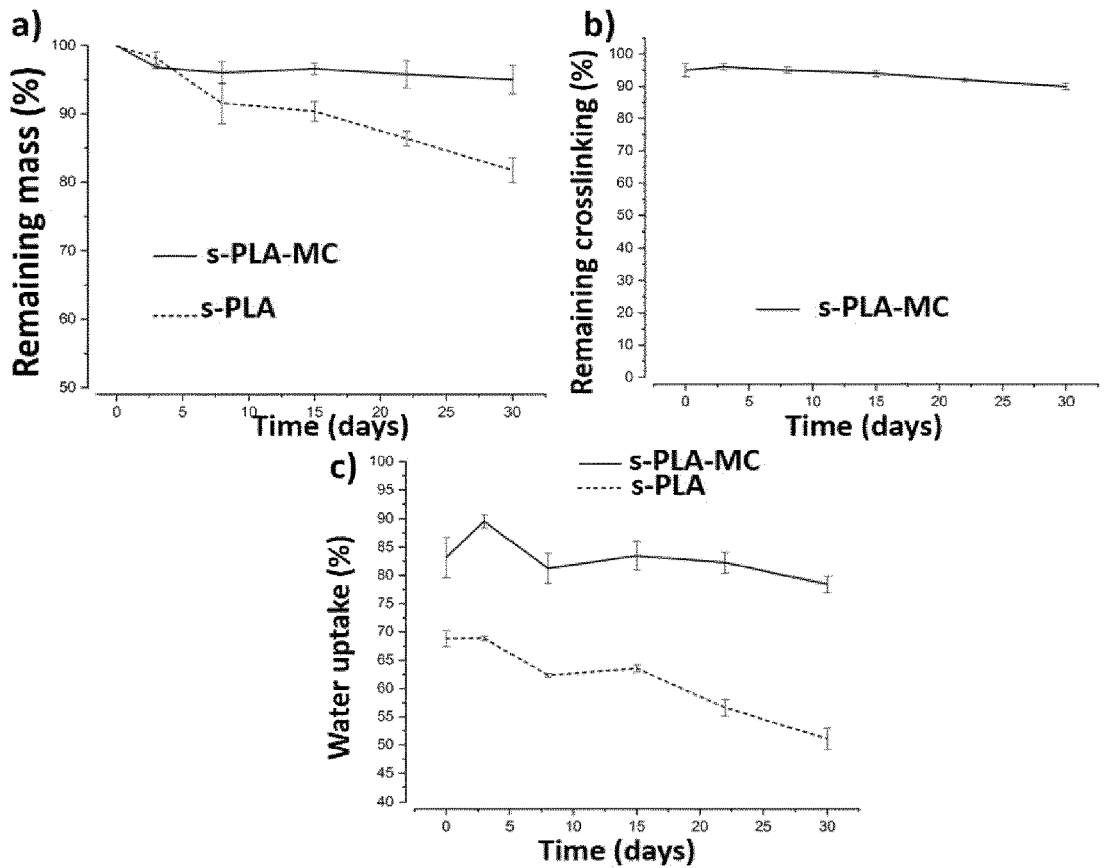
FIG. 14: Degradation of s-PLA-50-MC-based films by solvent evaporation with respect of a) remaining weight, b) remaining crosslinking and c) water uptake.

The degradation of s-PLA-50-MC (50 000 g/mol) based films made by solvent evaporation is illustrated on FIG. 14.

The remaining mass of non-functional block copolymer s-PLA decreased and reached 80% after 1 month of hydrolytic degradation (FIG. 14 a)—dotted line). On the contrary, no degradation occurred for s-PLA-50-MC after 1 month in terms of remaining weight and crosslinking (FIG. 14.a) (full line)—b)). Thus, the degradation process was slowed down by introducing covalent bonds inside polymer matrix.

Moreover, s-PLA-50-MC showed partial water uptake (80-85%) and its material structure was preserved in water (FIG. 14 c)).

2.6 Micro-Fibers-Based Tissues by Electrospinning Process

2.6.1 Micro-Fibers-Based Tissues Using Aryl-Azide Star-Shaped s-PLA-fN3 as Photo-Crosslinker and PLA$_{50}$-PLU200

UV Curing Step

Figure 15:
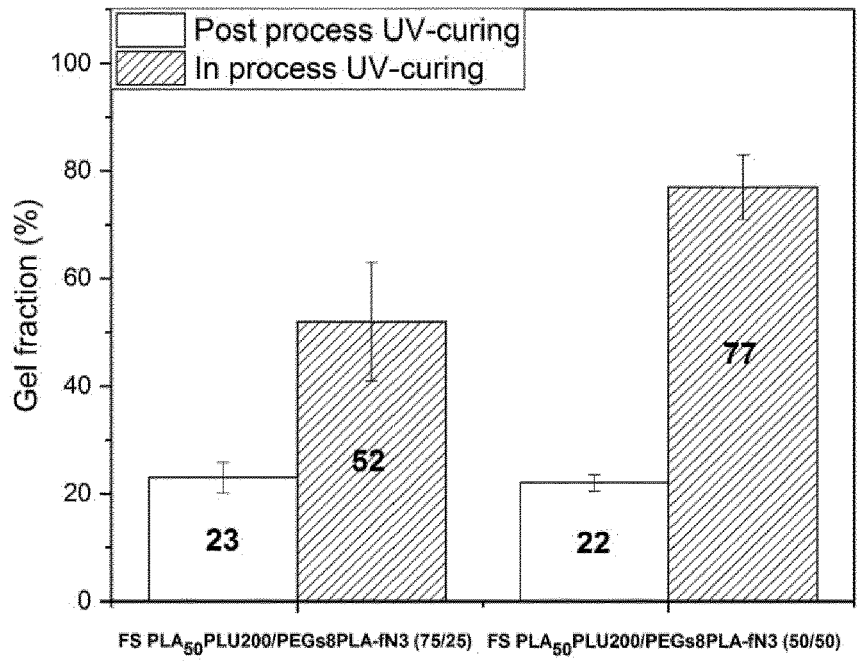
FIG. 15: Gel fraction (%) of fibrous scaffold based on PLA$_{50}$-PLU200/s-PLA-fN$_3$ 75/25 (left) or PLA$_{50}$-PLU200/s-PLA-fN$_3$ 50/50 (right) with in-process-UV-curing or post-process-UV-curing.

In process-UV-curing allowed an increase of the gel fraction of the fibrous scaffold compared to post process-UV curing from 23% to 52% for the fibrous scaffold PLA$_{50}$-PLU/s-PLA-fN$_3$ 75/25 and from 22% to 77% for the fibrous scaffold PLA$_{50}$-PLU/s-PLA-fN$_3$ 50/50 (see FIG. 15). The UV-curing of the fibrous scaffolds in thickness prevented the UV barrier of the aryl azide reactive groups allowing higher covalent bonds formation inside fibrous scaffolds.

Mechanical Properties

Figure 16:
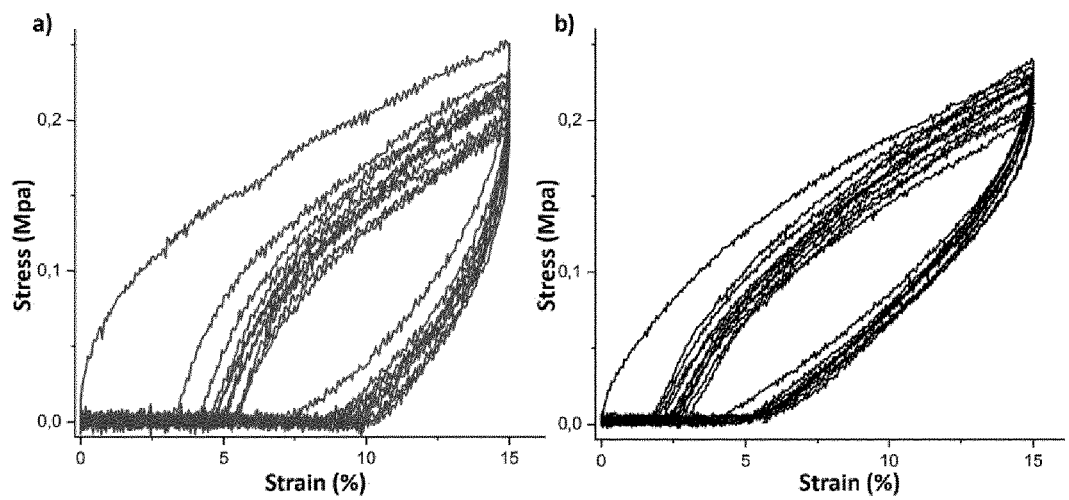
FIG. 16: Cyclic tensile tests for a 15% elongation of fibrous scaffold based on (a) PLA-Pluronic-PLA/s-PLA-fN$_3$ 75/25 and (b) PLA-Pluronic-PLA/s-PLA-fN$_3$ 50/50, both obtained after post-treatment UV curing. The analyses are carried out at a temperature of 37° C. over 10 cycles.

From the mechanical study, only the fibrous scaffolds based PLA$_{50}$-PLU/PEG$_{s8}$-PLA-fN3 with the ratios 75/25 and 50/50 exhibited rubber-like behavior. Thus, the ability of those elastomeric fibrous scaffolds to deform reversibly without loss of energy has been investigated through the cyclic stress-strain curves (see FIG. 16).

Both the photo-crosslinked FS PLA$_{50}$-PLU200/PEG$_{s8}$-PLA-fN$_3$ showed mechanical conservation over cyclic loads under 15% of deformation for both fibrous scaffolds.

2.6.2 Micro-Fibers-Based Tissues Using s-PLA-MC 100

Fibers Morphology

Figure 17:
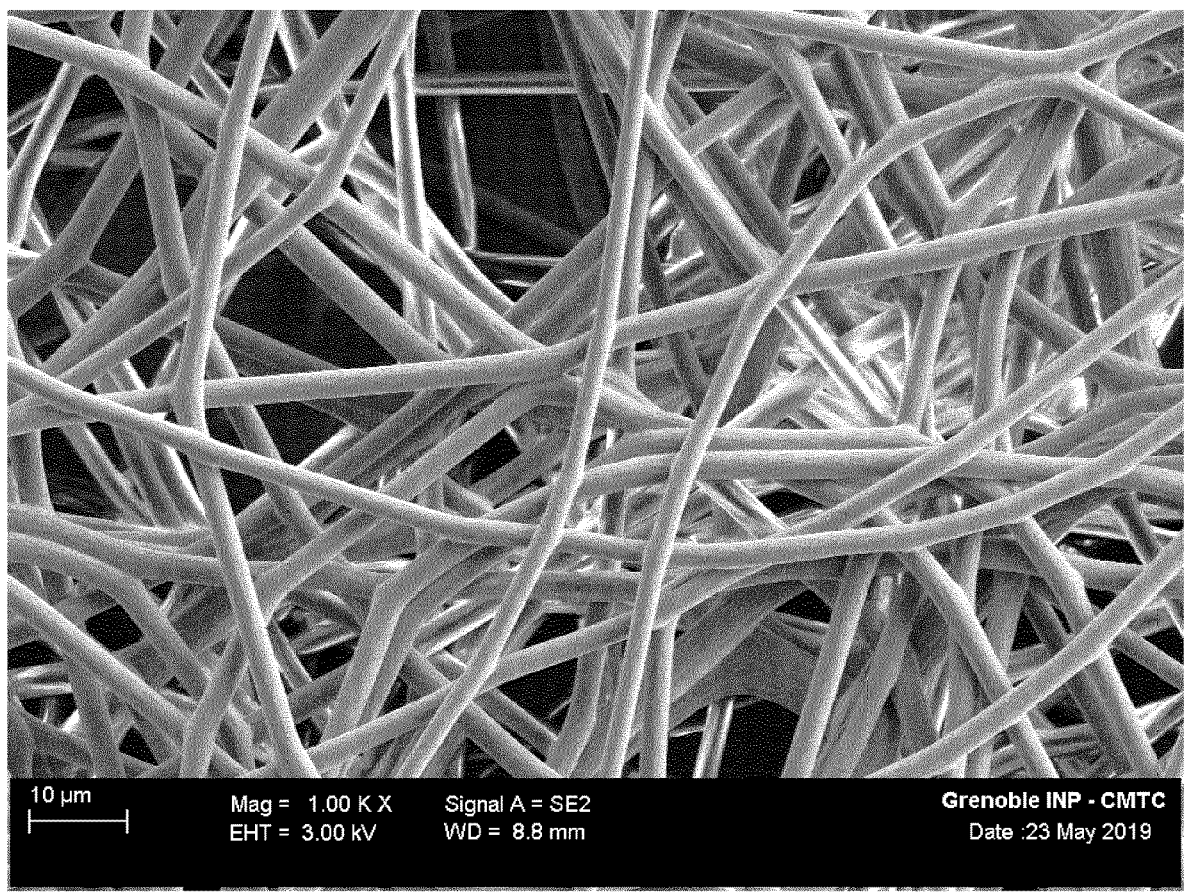
FIG. 17: SEM image of a fibrous scaffold based on s-PLA-100-MC (100 000 g·mol-1).

The fibrous scaffolds based on s-PLA-MC (100 000 g·mol$^1$) had micrometer fibers (2.8±0.3 µm) that is suitable for tissue engineering applications (see FIG. 17).

2.7 3D Materials by Stereolithography

Figure 18:
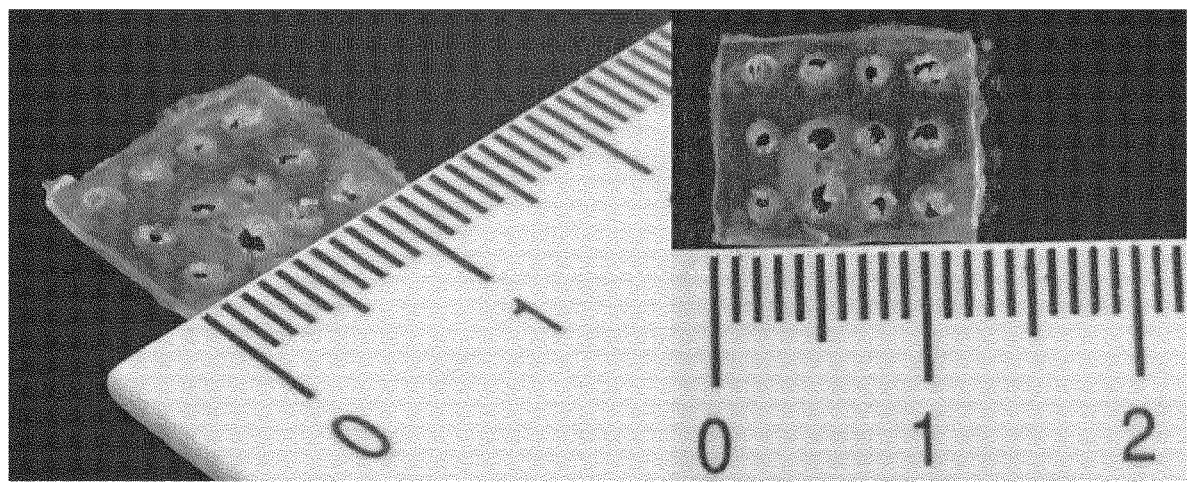
FIG. 18: Photo of porous materials obtained by 3D printing from s-PLA-50-MC (50 kg·mol-1).
Figure 19:
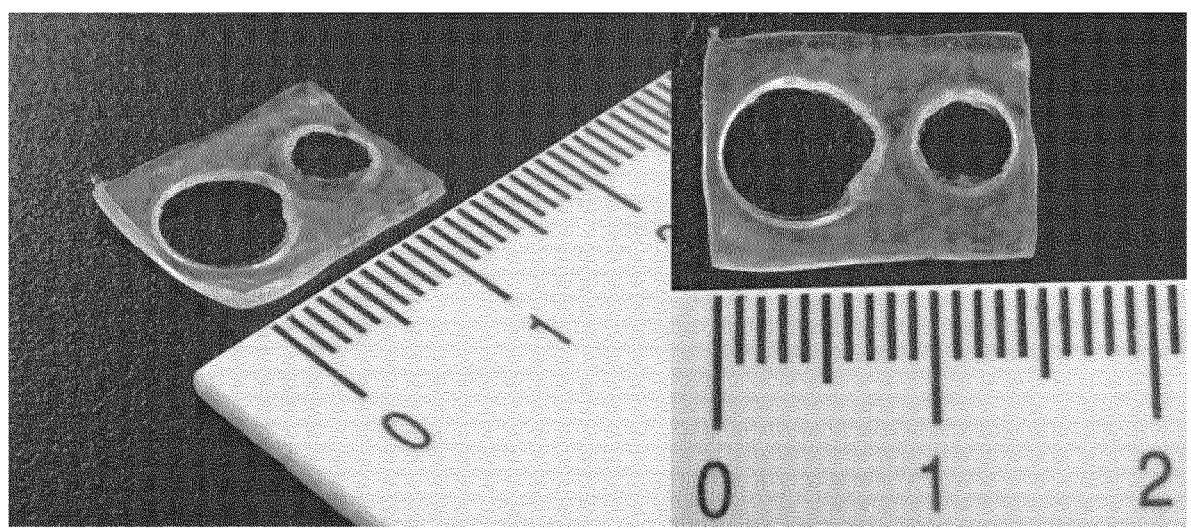
FIG. 19: Photo of materials obtained by 3D printing from s-PLA-50-MC (50 kg·mol-1).
Figure 20:
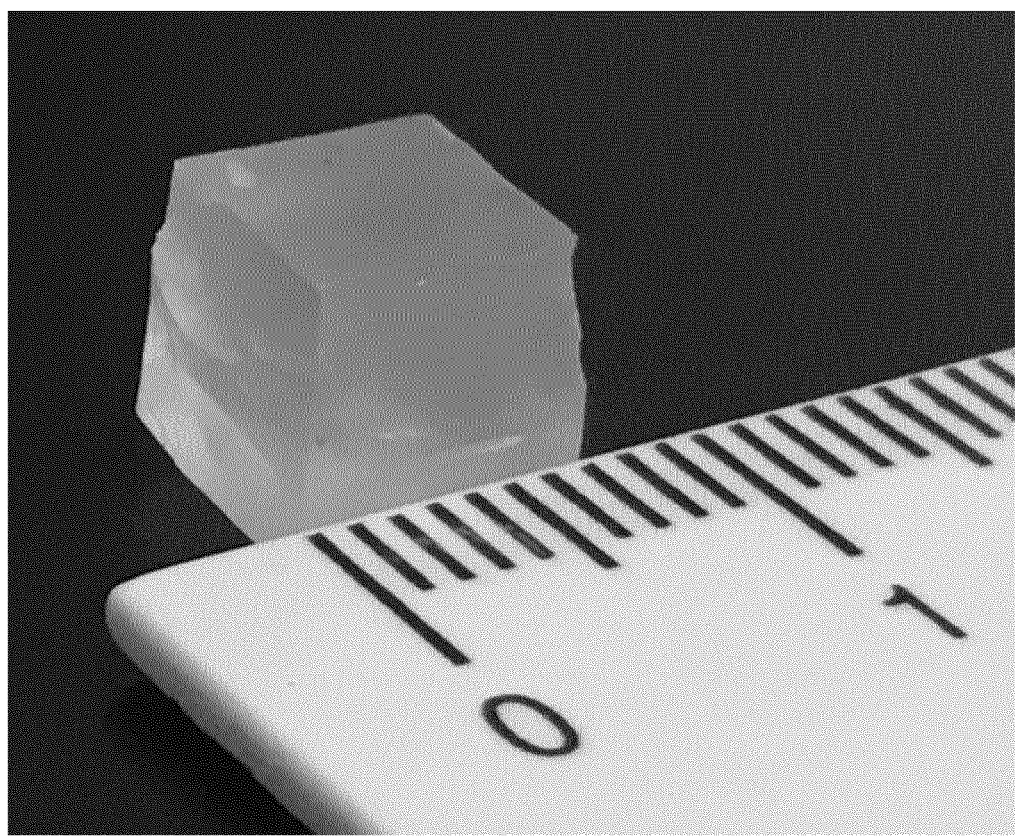
FIG. 20: Photo of cube obtained by 3D printing from s-PLA-50-MC (50 kg·mol-1).

Different materials were obtained from stereolithography process using s-PLA-50-MC polymer and are summarized in FIGS. 18 to 20. From our study, we were able to produce materials with various porous diameters (d=1 mm—FIG. 18|d=4 mm and d=7 mm—FIG. 19). As shown in FIG. 20, 3D material at millimeter scale could be obtained with multi(methacrylate) block copolymer s-PLA-50-MC.

The invention claimed is:

1. A degradable branched-block copolymer comprising a polyether central core having n arms and degradable polymer chains extending from each arm of the polyether central core, the polyether central core being a star core or a linear core, each degradable polymer chain being constituted by l monomer unit(s) of a degradable polymer, wherein each degradable polymer chain is identical and functionalized at its extremity by a photoreactive group chosen among an aryl-azide derivative, a (meth) acrylate group or a thiol group, said degradable branched-block copolymer being illustrated by the following schema:

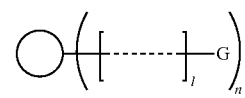

wherein -------- is the monomer unit of the degradable polymer constituting the degradable polymer chain,
G is the photoreactive group,
n is an integer between 4 and 32, and is

wherein

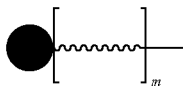

 is the star polyether central core, and
~~~ is the monomer unit corresponding to the polyether core, and
m is comprised between 4 and 400 and l is comprised between 4 and 1500, provided that when G is a (meth) acrylate group or a thiol group, the ratio m/l is being strictly superior to 0 and lower than or equal to 3, or

is

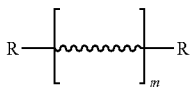

wherein ~~~ is the monomer unit which forms the linear polyether central core, and
R is a multivalent branched functional group comprising a number n/2 of terminal functions or atoms selected among oxygen atom or NH group, each of this terminal function being linked to one polymer chain and
m is comprised between 4 and 600 units and l is comprised between 2 and 400, provided that when G is a (meth) acrylate group or a thiol group, the ratio m/(n*l) is being strictly superior to 0 and lower than or equal to 1,
the degradable branched-block copolymer being non-water soluble when G is a (meth) acrylate group or a thiol group.

2. The degradable branched-block copolymer according to claim 1, wherein the polyether of the central core is chosen among polyethylene glycol (PEG), poloxamer or poloxamine.

3. The degradable branched-block copolymer according to claim 1, wherein the polyether core is a linear core and n is an integer between 4 and 16.

4. The degradable branched-block copolymer according to claim 1, wherein the polyether core is a star central core, the resulting star copolymer being illustrated by the following schema:

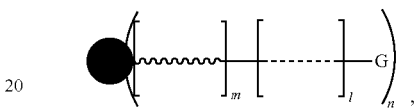

wherein ~~~ is the monomer unit corresponding to the polyether core, m being comprised between 4 and 400,
-------- is the monomer unit of the degradable polymer, l being comprised between 4 and 1500,
G is the photoreactive group,
n is an integer of at least 4, and
when G is a (meth) acrylate group or a thiol group, the ratio m/l is being strictly superior to 0 and lower than or equal to 3.

5. The degradable branched-block copolymer according to claim 4, wherein the polyether star central core has 4, 6 or 8 arms.

6. The degradable branched-block copolymer according to claim 1, wherein the degradable polymer of the degradable polymer chains is selected from the group constituted by a polyester, a polycarbonate, and mixtures thereof.

7. The degradable branched-block copolymer according to claim 6, wherein the polyester is selected from the group consisting of poly(lactide) (PLA), poly(ε-caprolactone) (PCL), polyhydroxybutyrate (PHB), polyhydroxybutyrate-co-hydroxyvalerate (PHBV), polyglycolic acid (PGA), poly (3-hydroxyvalerate), polydioxanone and mixtures thereof.

8. The degradable branched-block copolymer according to claim 1, wherein the photo-reactive group is an aryl-azide derivative.

9. A degradable branched-block copolymer according to claim 1, wherein the photo-reactive group is a (meth) acrylate or a thiol group.

10. The degradable branched-block copolymer according to claim 1, wherein the polyether core is a linear core and n is equal to 4, 8 or 16.

* * * * *